(12) United States Patent
Etori

(10) Patent No.: US 7,481,564 B2
(45) Date of Patent: Jan. 27, 2009

(54) LIGHT CONTROL FILM AND BACKLIGHT UNIT USING THE SAME

(75) Inventor: Hideki Etori, Saitama (JP)

(73) Assignee: Kimoto Co., Ltd. (JP)

(*) Notice: Subject to any disclaimer, the term of this patent is extended or adjusted under 35 U.S.C. 154(b) by 218 days.

(21) Appl. No.: 10/591,760

(22) PCT Filed: Mar. 2, 2005

(86) PCT No.: PCT/JP2005/003529

§ 371 (c)(1),
(2), (4) Date: Sep. 1, 2006

(87) PCT Pub. No.: WO2005/085914

PCT Pub. Date: Sep. 15, 2005

(65) Prior Publication Data

US 2007/0171654 A1    Jul. 26, 2007

(30) Foreign Application Priority Data

Mar. 3, 2004 (JP) .............. 2004-059602
Mar. 3, 2004 (JP) .............. 2004-059603

(51) Int. Cl.
*F21V 5/00* (2006.01)

(52) U.S. Cl. ............ 362/619; 362/618; 362/606

(58) Field of Classification Search .......... 362/618, 362/619, 627, 606
See application file for complete search history.

(56) References Cited

U.S. PATENT DOCUMENTS

| 5,944,405 | A | 8/1999 | Takeuchi et al. ........... 362/31 |
| 5,995,288 | A | 11/1999 | Kashima et al. ........... 359/599 |
| 6,505,959 | B2* | 1/2003 | Masaki et al. ............. 362/339 |
| 6,846,098 | B2* | 1/2005 | Bourdelais et al. ......... 362/330 |

FOREIGN PATENT DOCUMENTS

| JP | 09-127314 | 5/1997 |
| JP | 2000-48613 | 2/2000 |
| JP | 2002-260424 | 9/2002 |
| JP | 2002-328209 | 11/2002 |
| JP | 2004-37520 | 2/2004 |

* cited by examiner

*Primary Examiner*—Laura Tso
(74) *Attorney, Agent, or Firm*—Bacon & Thomas, PLLC

(57) ABSTRACT

The light control film provides improved front luminance and appropriate diffusion without the problems of interference pattern, glare. The light control film has a rough surface that, for substantially any arbitrary cross section perpendicular to a base plane of the film, has an average $\theta_{ave}$ of absolute values of slope, with respect to the base plane of a curve along the edge of the cross section, which is not less than 20 degrees and not more than 75 degrees, and has an absolute value of skewness (JIS B0601:2001) of the profile curve of not more than 1.2.

18 Claims, 8 Drawing Sheets

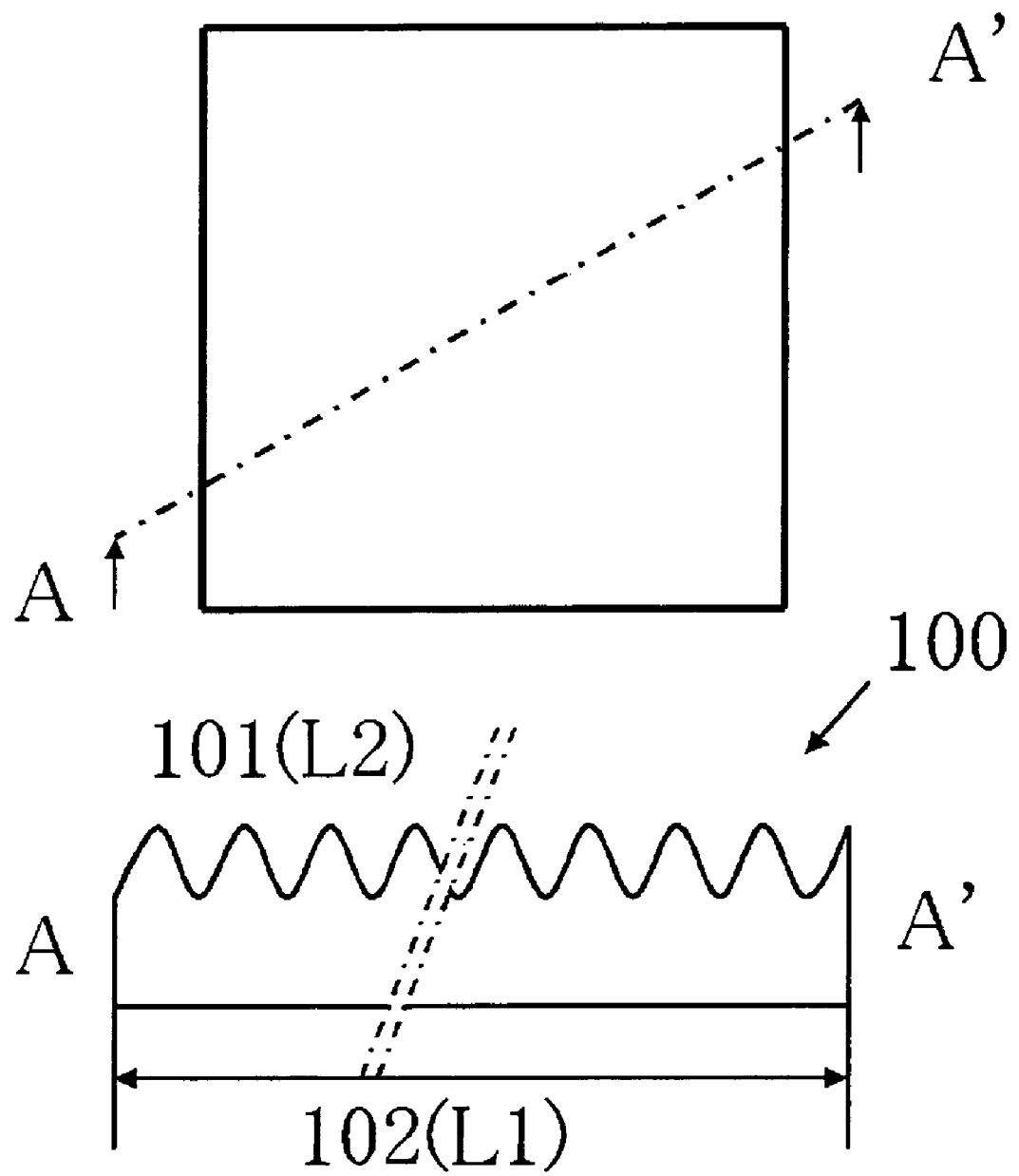
[Fig.1]

[Fig.2]
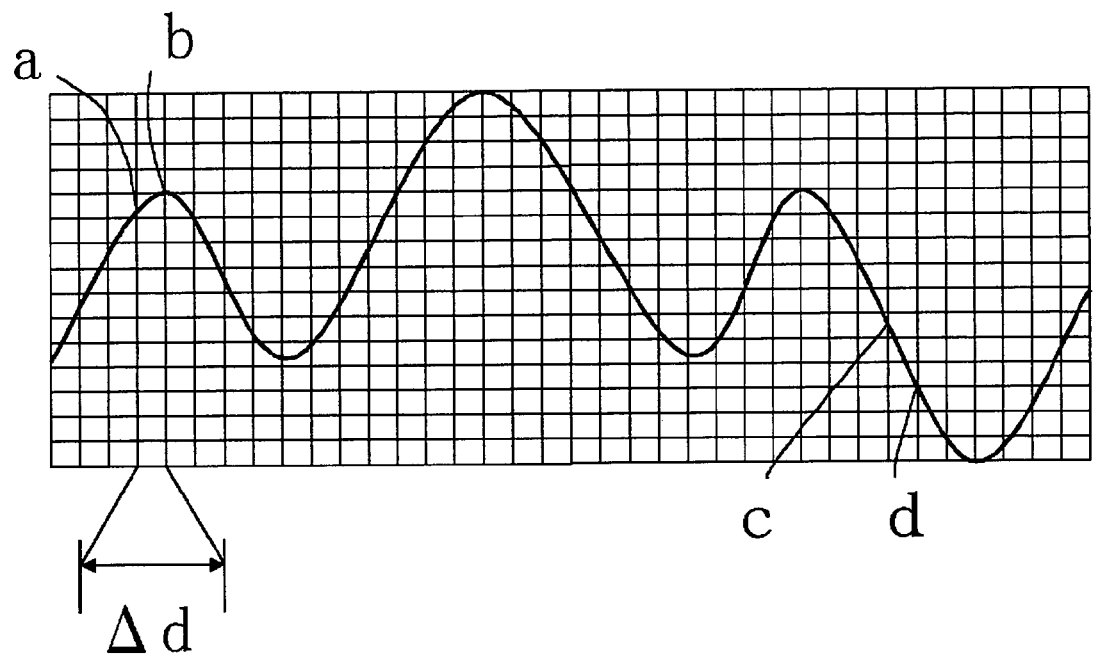
[Fig.3]
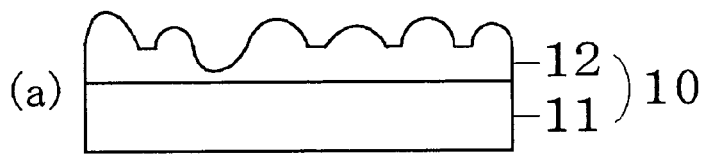

[Fig.4-1]
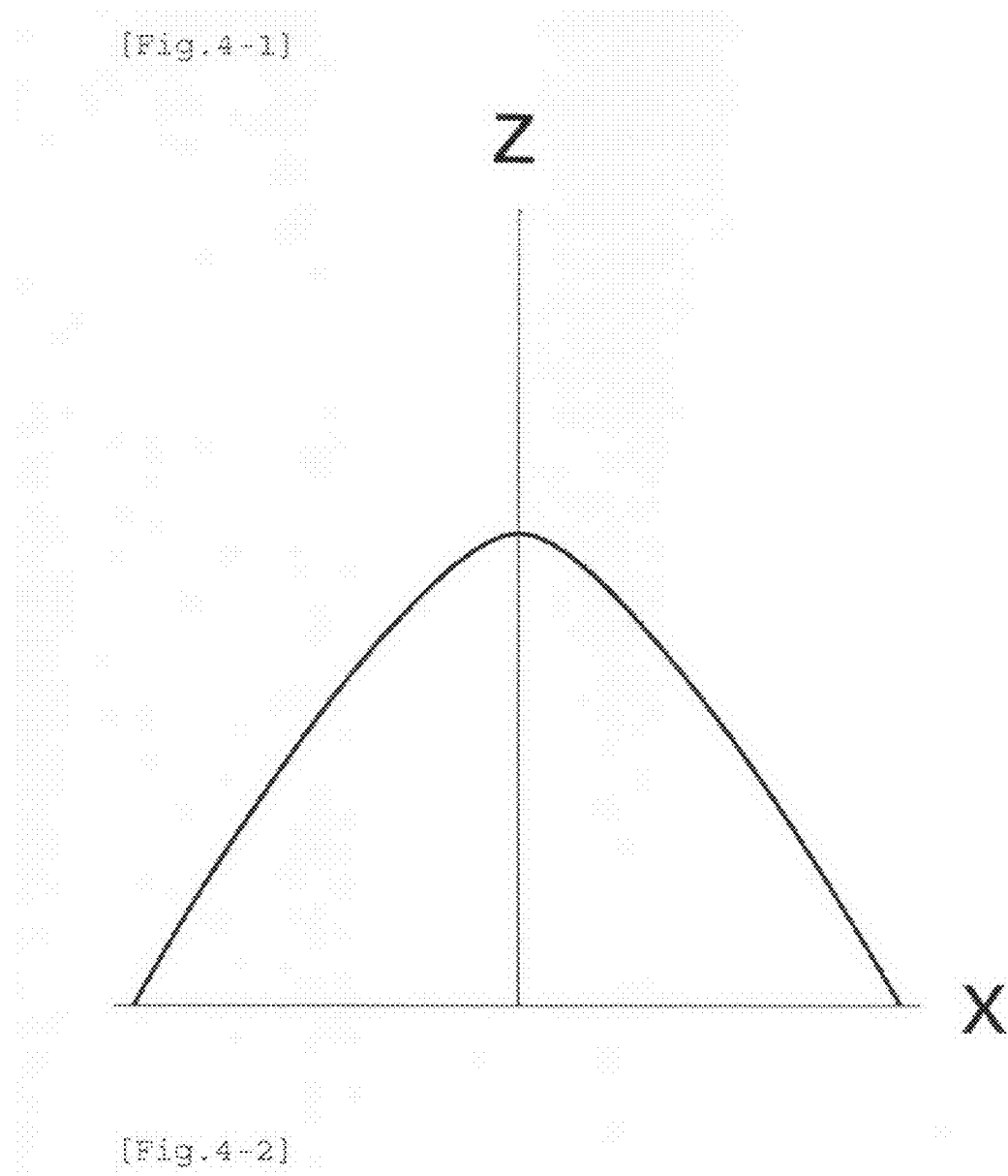
[Fig.4-2]
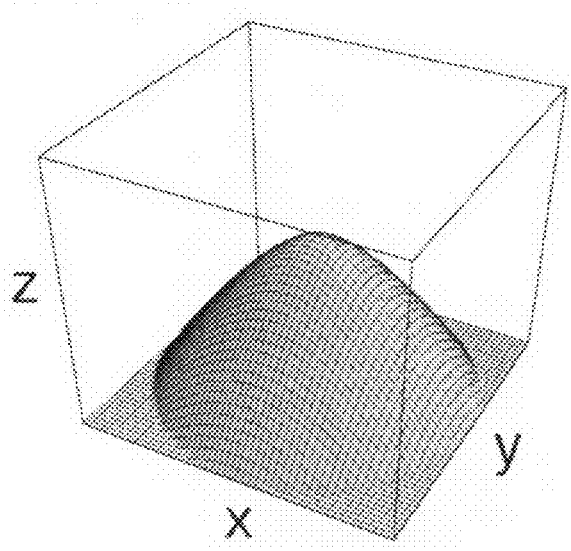

[Fig.5]
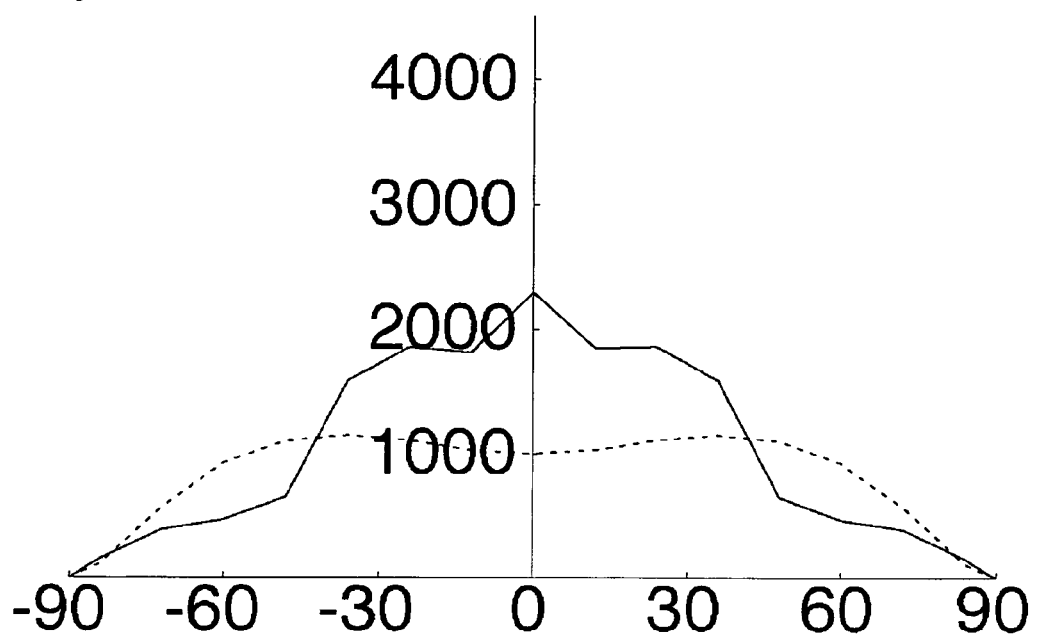
[Fig.6]
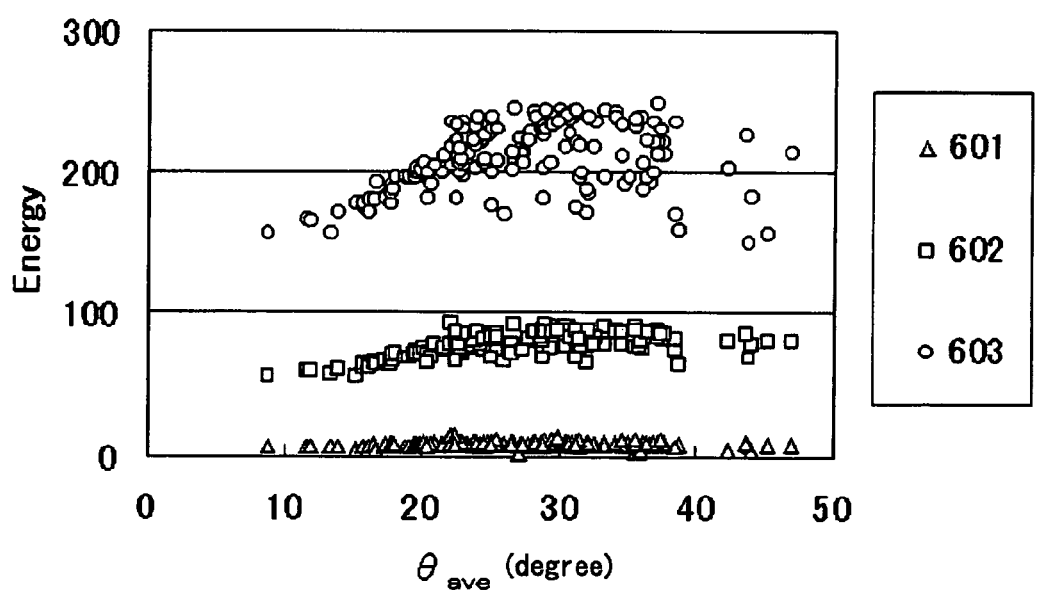

[Fig.7]
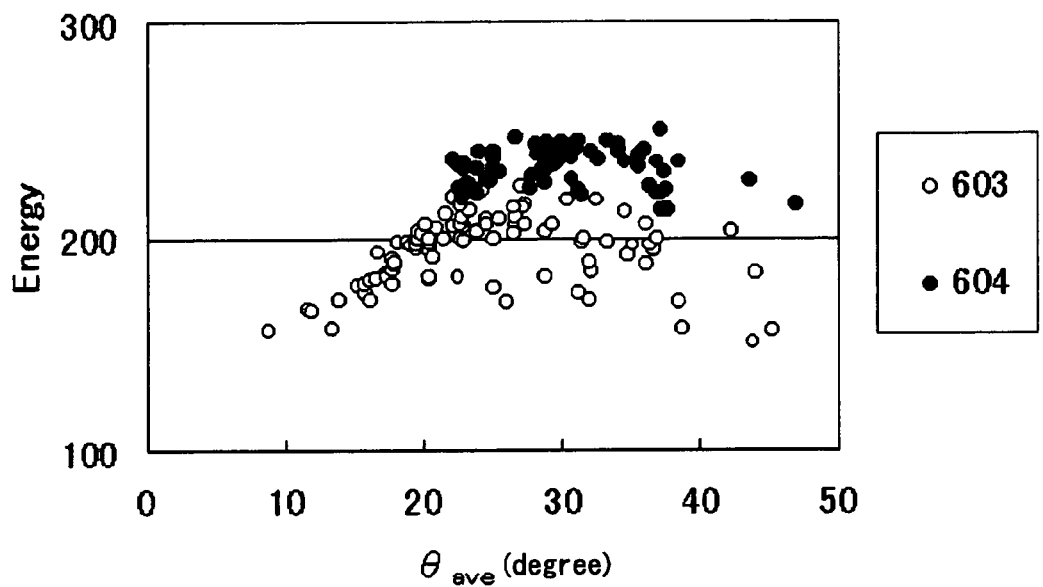
[Fig.8]
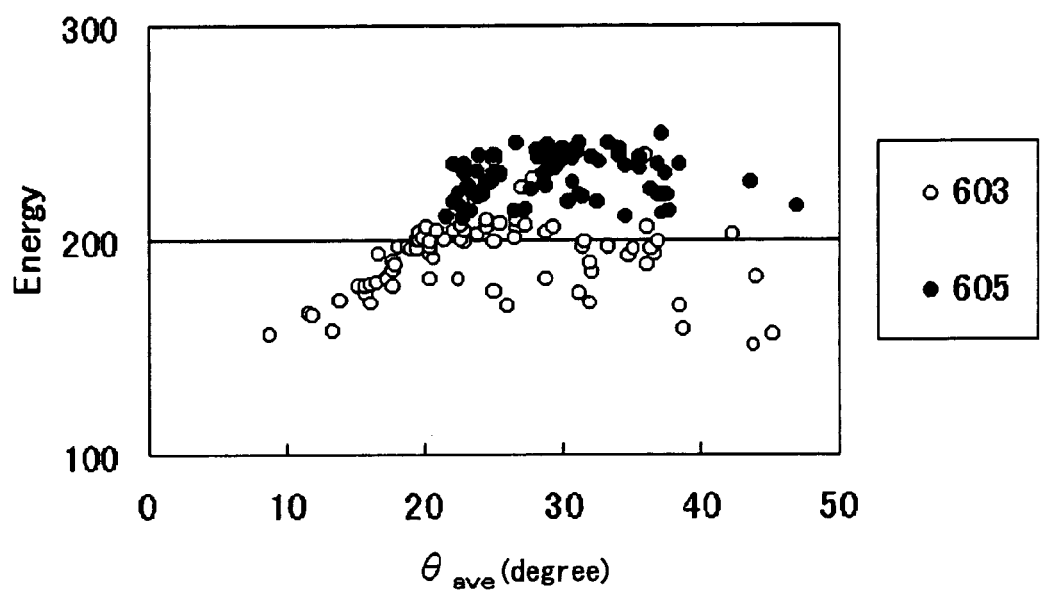

[Fig.9]
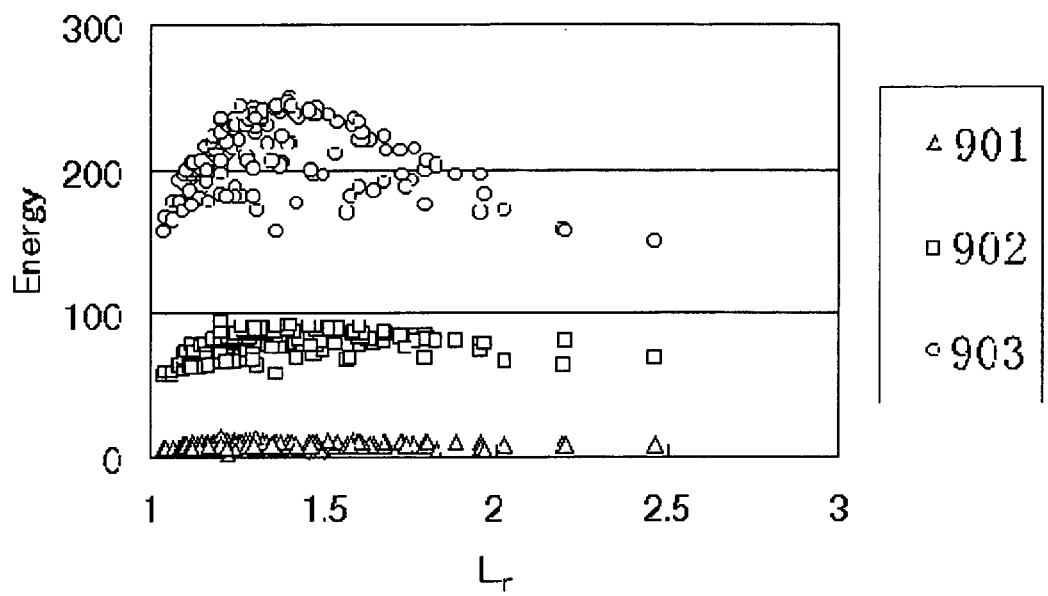
[Fig.10]
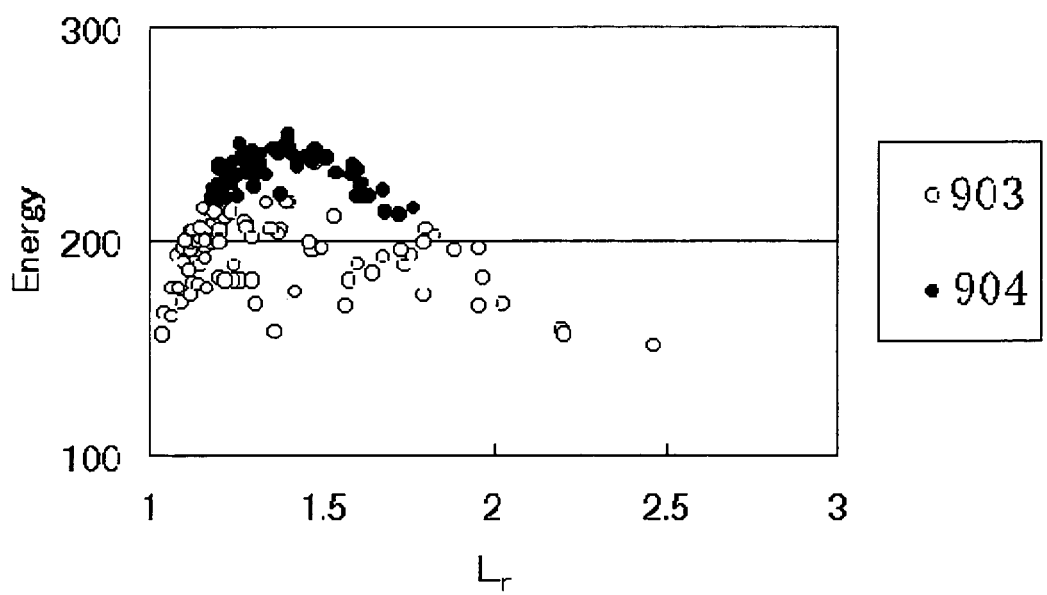

[Fig.11]
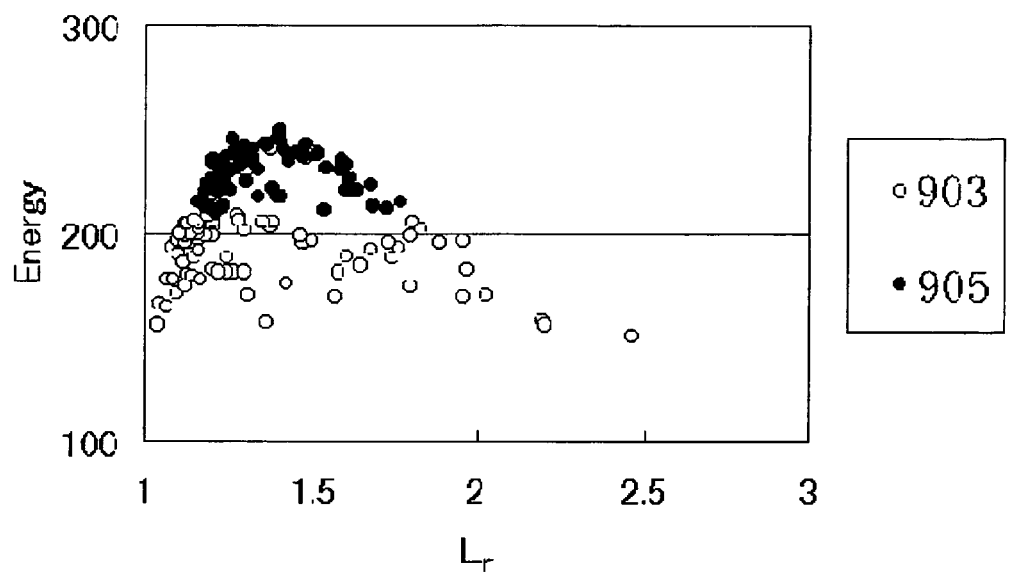
[Fig.12]
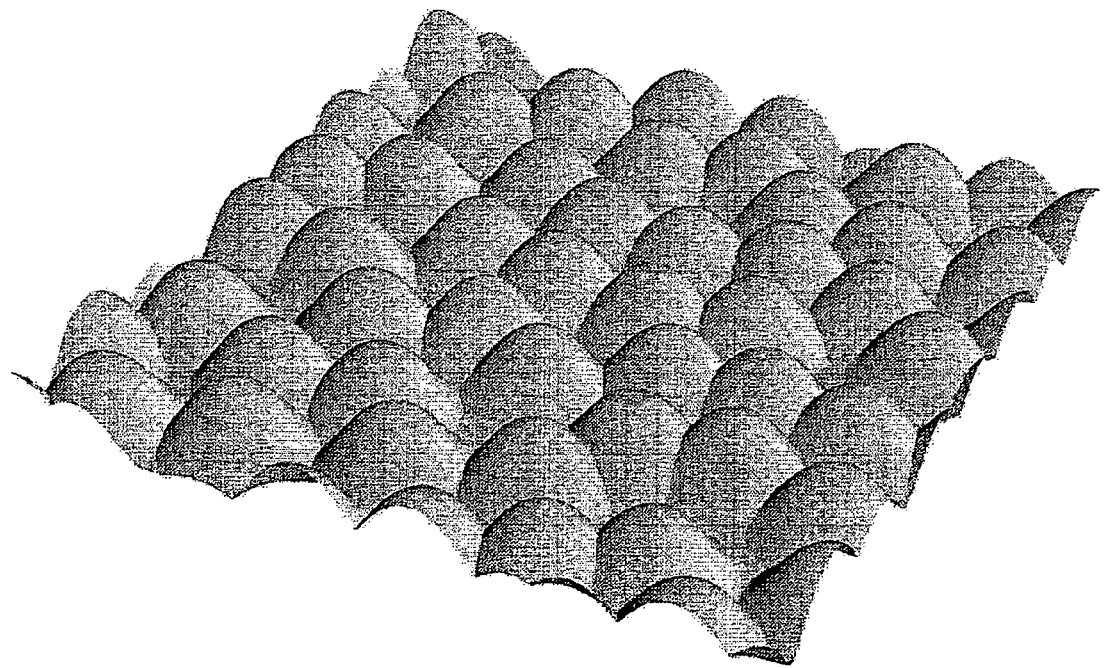

[Fig.13]
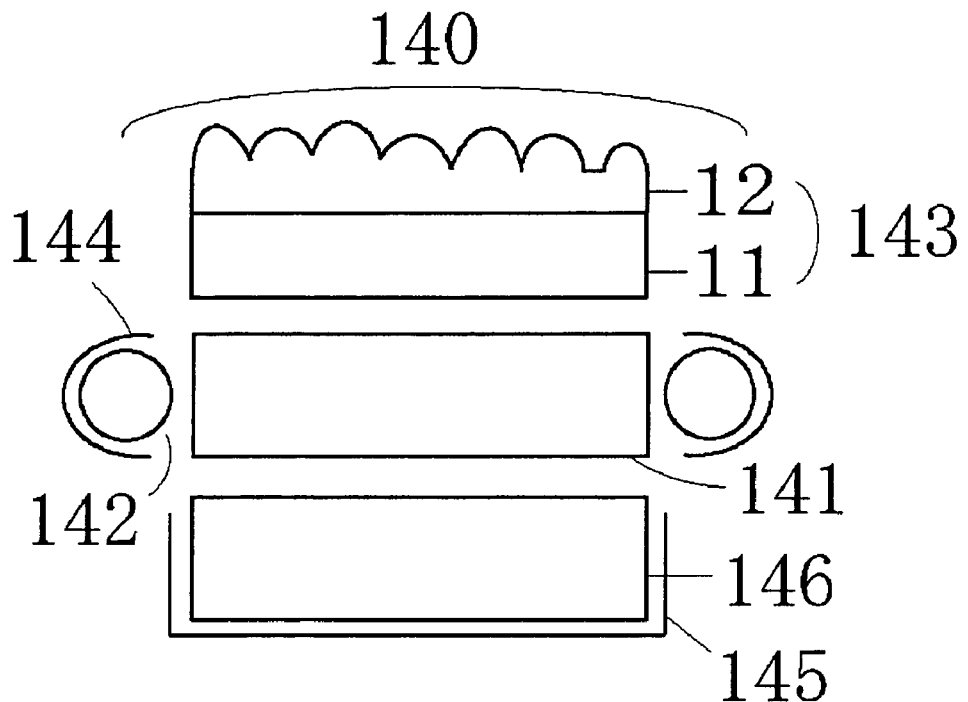
[Fig.14]
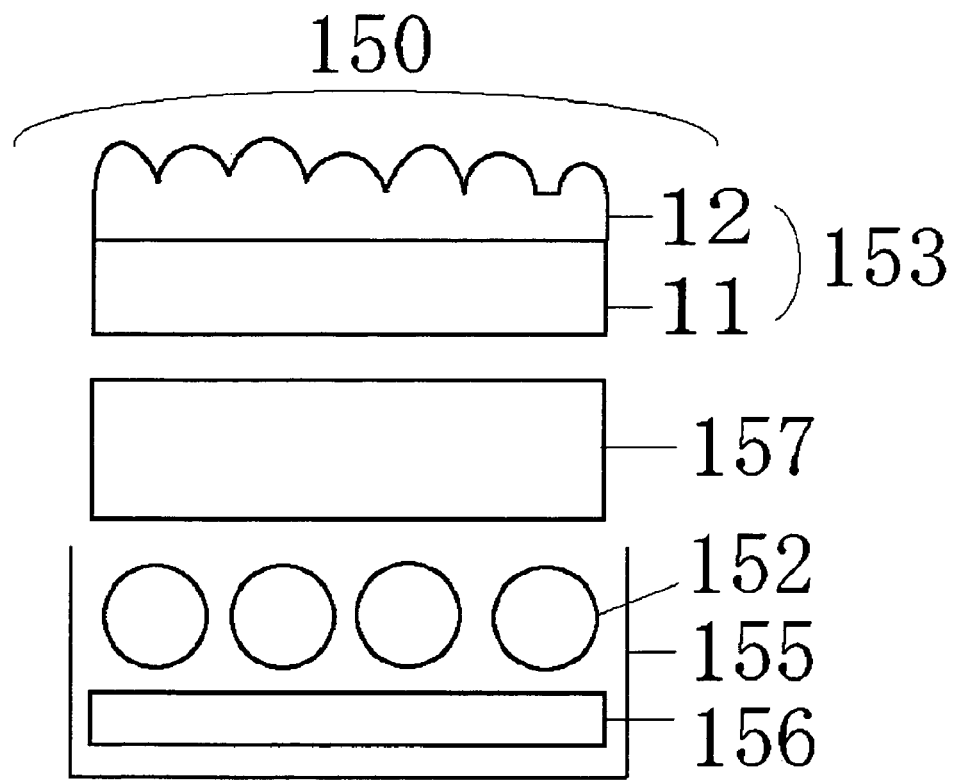

LIGHT CONTROL FILM AND BACKLIGHT UNIT USING THE SAME

TECHNICAL FIELD

The present invention relates to a light control film for backlight units such as those used for liquid crystal displays and so forth, and a backlight unit using the same.

BACKGROUND ART

For liquid crystal displays, backlight units of the edge light type or direct light type are conventionally used. Since backlight units of the edge light type can be manufactured with a small thickness, they are used for notebook computers etc., whereas backlight units of the direct type are used for large-sized LCD television, etc.

Light emitted from these conventional backlight units contains components emitted in directions significantly angled from the front direction, especially light emitted from backlight units of the edge light type, and thus it is difficult to obtain high front luminance.

Therefore, in the conventional backlight units, two or more optical films such as prism sheets and light diffusing films are used in combination in order to improve front luminance so that the light is directed to the front (see, for example, Japanese Patent Unexamined Publication (KOKAI) No. 9-127314 (claim 1, paragraph 0034)).

Although prism sheets can increase the portion of the light emitted to the front (in a direction perpendicular to film surface) by surface design based on geometric optics. However, they have drawbacks in that they are likely to exhibit an interference pattern due to regularly arranged convex portions, and in that, if used alone, they produce glare and thus impair the visibility of images. Moreover, they unduly concentrate light to the front, and therefore they cannot provide a wide viewing angle.

On the other hand, if diffusion films are used alone, the front luminance becomes insufficient, although the aforementioned problems are not caused.

Therefore, a prism sheet and a light diffusing film are used in combination as described above. However, the front luminance enhanced by the prism sheet is reduced by the light diffusing film. Moreover, the films assembled in layers may generate Newton rings between the layers, or become scratched due to their contact.

See Japanese Patent Unexamined Publication (KOKAI) No. 9-127314

SUMMARY OF THE INVENTION

Therefore, an object of the present invention is to provide a light control film that provides improved front luminance when used alone or in combination with a prism sheet, provides appropriate light diffusion, and does not produce an interference pattern or glare, and a backlight unit using the same.

In order to achieve the aforementioned object, the inventor of the present invention studied the various factors defining the surface profile of light control films such as the convexo-concave profile, lengths, slopes with respect to film surface (base plane), heights and pitches of the convexo-concave portions, and as a result, found that the front luminance could be improved by appropriately controlling slopes of the rough surface with respect to the base plane and the profile thereof.

More specifically, it was found that superior front luminance could be achieved, if, for any cross section 100 in an arbitrary direction perpendicular to a film plane (plane of the film surface opposite the rough surface) as shown in FIG. 1, conditions A and B are satisfied. Condition A requires that the average $\theta_{ave}$ of absolute values of slope (degree of angles) of a curve defining the periphery of the cross section (profile curve 101) be within a predetermined range (condition A1) and/or that the ratio $L_r = L2/L1$, wherein L1 is the length of a straight line 102 defined as an intersection of the film plane and the cross section and L2 is the length of the profile curve 101, be within a predetermined range (condition A2). Condition B requires that skewness $P_{sk}$ of the profile curve, as defined by JISB0601:2001, be within a predetermined range (condition B1), and/or that kurtosis $P_{ku}$ of the profile curve, as defined by JISB0601:2001, be within a specific range (condition B2).

The values for the conditions A1 and A2 are parameters determining the degree of slopes of the convex and concave forms on the rough surface of the film, and the values for the conditions B1 and B2 are parameters determining the shapes of the convex and concave forms. Specifically, the skewness $P_{sk}$ represents asymmetry, i.e., degree of deviation degree, of heights of convex and concave forms (measure of asymmetry of a probability density function for the height). For example, for a convex shape which does not deviate from the central line, $P_{sk}$ is 0, and a larger absolute value of $P_{sk}$ represents larger deviation from the central line, while the sign of $P_{sk}$ differs depending on the direction in which the convex shape deviates. The kurtosis $P_{ku}$ represents sharpness of the convex and concave forms (measure of sharpness of probability density function along the height), and when the probability density function has a shape of normal distribution, the kurtosis $P_{ku}$ is 3. When the kurtosis $P_{ku}$ is larger than 3, the convex form will have a sharper shape, and when the kurtosis $P_{ku}$ is smaller than 3, the convex form will have a shape with a squashed apex. The light control film of the present invention satisfies, among such conditions for the slope and shape, at least one of A1 and A2, and at least one of B1 and B2.

Thus, in one aspect, the light control film of the present invention is a light control film having a rough surface, having, for any arbitrary cross section perpendicular to a base plane of the film, an average $\theta_{ave}$ of absolute values of slope, with respect to the base plane of a curve along the edge of the cross section contoured by the rough surface (hereinafter "profile curve") of not less than 20 degrees and not more than 75 degrees, and, for substantially all profile curves, the absolute value for skewness, according to JIS B0601:2001,' is not more than 1.2 (condition A1+condition B1).

In another aspect, the light control film of the present invention is a light control film having a rough surface of a patterned layer of a material having a refractive index n, wherein the rough surface has, for any arbitrary cross section perpendicular to a base plane of the film, an average $\theta_{ave}$ of absolute values for slope, with respect to the base plane of a curve along the edge of the cross section contoured by the rough surface, not less than (36−10n) degrees and not more than (86−10n) degrees, and wherein substantially all profile curves have an absolute value of skewness, according to JIS B0601:2001, of not more than (n−0.4) (condition A1' (condition A1 considering the refractive index n)+condition B1).

In yet another aspect, the light control film of the present invention is a light control film having a rough surface, wherein the rough surface has, for any arbitrary cross section perpendicular to a base plane of the film, an average $\theta_{ave}$ of absolute values for slope, with respect to the base plane of a profile curve along the edge of the cross section contoured by the rough surface, of not less than 20 degrees and not more than 75 degrees, and wherein substantially all profile curves have a kurtosis (JIS B0601:2001) not less than 1.5 and not more than 5.0 for substantially any profile curve (condition A1+condition B2).

In another aspect, the light control film of the present invention is a light control film having a rough surface formed by a patterned layer of a material having a refractive index n, wherein the rough surface has, for any arbitrary cross section perpendicular to a base plane of the film, an average ($\theta_{ave}$, degree) of absolute values for slope, with respect to the base plane of a profile curve along the edge of the cross section contoured by the rough surface, not less than (36–10n) degrees and not more than (86–10n) degrees, and wherein substantially all profile curves have a kurtosis (JIS B0601: 2001) not less than 1.5 and not more than (10n–11) (condition A1'+condition B2).

In yet another aspect, the light control film of the present invention is a light control film having a rough surface, wherein the rough surface has, for an arbitrary cross section perpendicular to a base plane of the film, a ratio $L_r=L2/L1$, wherein L2 is the length of a curve along the edge of the cross section contoured by the rough surface and L1 is the length of a straight line defined as an intersection of the base plane and the cross section, of $1.1 \leq L_r \leq 1.8$, and wherein the absolute value of skewness, according to JIS B0601:2001, of the profile curve is not more than 1.2 for substantially all cross sections (condition A2+condition B1).

In another aspect, the light control film of the present invention is a light control film having a rough surface on a patterned layer of a material having a refractive index n, wherein the rough surface has, for any arbitrary cross section perpendicular to a base plane of the film, a ratio $L_r=L2/L1$, wherein L2 is the length of a profile curve along the edge of the cross section contoured by the rough surface and L1 is the length of a straight line defined as an intersection of the base plane and the cross section, wherein $(1.9-0.5n) \leq L_r \leq 1.8$, and wherein substantially all arbitrary cross-sections have an absolute value of skewness, according to JIS B0601:2001, of not more than (n–0.4) (condition A2' (condition A2 considering the refractive index n)+condition B1).

In yet another aspect, the light control film of the present invention is a light control film having a rough surface which has, for any arbitrary cross section perpendicular to a base plane of the film, a ratio $L_r=L2/L1$, wherein L2 is the length of the profile curve along the edge of the cross section contoured by the rough surface and L1 is the length of a straight line defined as an intersection of the base plane and the cross section, wherein $1.1 \leq L_r \leq 1.8$, and wherein substantially all arbitrary cross-sections have a kurtosis, according to JIS B0601:2001, of the profile curve which is not less than 1.0 and not more than 4.5 (condition A2+condition B2).

In other embodiments, the light control film of the present invention is a light control film having a rough surface on a patterned layer of a material having a refractive index n, wherein the rough surface has, for any arbitrary cross section perpendicular to a base plane of the film, a ratio $L_r=L2/L1$, wherein L2 is the length of the profile curve along the edge of the cross section contoured by the rough surface and L1 is the length of a straight line defined as an intersection of the base plane and the cross section ($L_r=L2/L1$) is $(1.9-0.5n) \leq L_r \leq 1.8$, and wherein substantially all profile curves have a kurtosis according to JIS B0601:2001, of not less than 1.0 and not more than (10n–11.5) (condition A2'+condition B2)

In the present invention, the "base plane of the film" means a plane of the film regarded as substantially planar, and when the face of the light control film of the present invention opposite to the face on which the convex and concave shapes are formed is smooth, the plane of this opposing face can be regarded as the base plane. When the opposite face is not smooth but a rough surface, a plane centered between the two different faces can be regarded as the base plane.

When a profile curve is represented as y=f(x), the length L2 of the profile curve with respect to such a base plane can be represented by the following equation (1) using f'(x) obtained by differentiating f(x) with x.

$$L2 = \int_0^{L1} \sqrt{1 + f'(x)^2} \, dx \qquad (1)$$

Further, slopes of the profile curve relative to the base plane can be generally obtained as f'(x) obtained by differentiating f(x) with x, and average ($S_{av}$) of absolute values thereof can be represented by the following equation (2) wherein L represents the length of intervals for which the aforementioned values are calculated. Further, when the slopes are indicated as a unit of angle, the average of absolute values of such slopes ($\theta_{av}$) can be represented by the following equation (3).

$$S_{av} = \frac{1}{L} \int_0^L |f'(x)| \, dx \qquad (2)$$

$$\theta_{av} = \frac{1}{L} \int_0^L |\tan^{-1} f'(x)| \, dx \qquad (3)$$

However, although it is possible to use such a function for product designing, it is almost impossible to describe a profile curve with a general function for an actual product, and thus the length L2 and the average of absolute values of slopes are difficult to obtain. Therefore, in the present invention, values calculated as follows are defined as the length of the profile curve and the average of absolute values of slope.

First, a profile curve is measured from an arbitrary point on a rough surface along an arbitrary direction by using a surface profiler. The results of measurement include height data measured at positions ($d_1, d_2, d_3 \ldots d_m$) separated by a predetermined interval $\Delta d$ from each other, ($h(d_1), h(d_2), h(d_3) \ldots h(d_m)$). This data can be represented as a curve in a graph in which the vertical axis indicates height of the convex and concave shapes and the horizontal axis indicates the direction of the profile curve, for example, as shown in FIG. 2. Portions of the profile curve, each corresponding to one interval (e.g., (a-b), (c-d)), can be regarded as straight lines, if the interval is sufficiently short, and the lengths thereof $\lambda_i$ ($i=1, 2, 3 \ldots m-1$) can be represented by the following equation (4).

$$\lambda_i = \sqrt{(h(d_i) - h(d_{i+1}))^2 + \Delta d^2} \qquad (4)$$

Then, the lengths obtained for all the portions of the profile curve corresponding to a predetermined interval ($\Delta d$) are summed to obtain L2, as represented by the following equation (5).

$$L2 = \sum_{i=1}^{m-1} \lambda_i \tag{5}$$

Further, absolute value $\theta_i$ (i=1, 2, 3 ... m−1) of slope of a portion of the profile curve corresponding to one interval as described above can be represented by the following equation (6) wherein the unit is degrees.

$$\theta_i = \tan^{-1}\left(\frac{h(d_{i+1}) - h(d_i)}{\Delta d}\right) \tag{6}$$

Further, average of the aforementioned slopes obtained for all the portions of the profile curve divided into the predetermined interval ($\Delta d$) as shown in the following equation (7) is used as the average of absolute values of slope $\theta_{ave}$.

$$\theta_{ave} = \frac{1}{m}\sum_{i=1}^{m}|\theta_i| \tag{7}$$

The length of the aforementioned interval ($\Delta d$) is chosen such that the profile of the rough surface is sufficiently correctly represented by the profile curve, i.e. an interval of about 1.0 vm or shorter.

The backlight unit of the present invention is a backlight unit comprising a light guide plate and a light source directed at least at one edge surface thereof, the light guide plate having a light emergent surface approximately perpendicular to the edge surface and a light control film of the present invention provided on the light emergent surface of the light guide plate.

The backlight unit of the present invention may further include a prism sheet between the light control film and the light guide plate.

The backlight unit of the present invention may also be a backlight unit comprising a light source, a light diffusive plate provided on one side of the light source and the light control film of the present invention provided on the side of the light diffusive plate opposite to the light source.

The light control film of the present invention can increase the amount of light emitted in the front direction, in particular, those emissions at an angle of 0 to 30 degrees, for light entering from the surface opposite the rough surface and emitted from the rough surface, and thus provide markedly higher front luminance as compared with the usual diffusing films. In addition, it also provides appropriate light diffusion and does not generate glare or interference pattern.

Accordingly, the backlight unit of the present invention is a backlight unit which provides high front luminance and appropriate light diffusion, and which does not generate glare or an interference pattern, due to use of a particular light control film. Moreover, it can prevent scratching of a prism sheet due to contact with other members.

BRIEF DESCRIPTION OF THE DRAWINGS

FIG. 1 shows a light control film with a rough surface in accordance with the present invention.

FIG. 2 shows a profile curve of the light control film the present invention.

FIGS. 3(*a*)-3(*c*) are sectional views of embodiments of the light control films of the present invention.

FIGS. 4-1 is a sectional view of a three-dimensional shape of a convex portion used to stimulate differences in emergent angle characteristics due to differences in shape.

FIGS. 4-2 is a perspective view of the three-dimensional shape of the convex portion shown in FIG. 4-1.

FIG. 5 is a graph of the results of three-dimensional simulation.

FIG. 6 is another graph of results of three-dimensional simulation.

FIG. 7 is another graph of results of three-dimensional simulation.

FIG. 8 is yet another graph of results of three-dimensional simulation.

FIG. 9 is another graph of results of three-dimensional simulation.

FIG. 10 is another graph of results of three-dimensional simulation.

FIG. 11 is another graph of results of three-dimensional simulation.

FIG. 12 is a perspective view of an example of the rough surface of the light control film of the present invention.

FIG. 13 is a schematic of an embodiment of a backlight unit of the present invention.

FIG. 14 is a schematic of another embodiment of a backlight unit of the present invention.

DESCRIPTION OF PREFERRED EMBODIMENTS

The light control film and backlight unit of the present invention will now be explained in detail with reference to the drawings. The sizes (thickness, width, height etc.) of the elements illustrated in the drawings for explanation of the present invention are enlarged or reduced as required for explanation and do not reflect the sizes of the elements of an actual light control film or actual backlight unit.

FIGS. 3 (*a*) to 3 (*c*) schematically show examples of the light control film of the present invention. As shown in the drawings, the light control film of the present invention has fine convex and concave shapes formed on one face of a substantially planar film and defining a characteristic profile in cross-section. The convex and concave shapes may be formed on a layer provided on one face of a film used as a substrate as shown in 3 (*a*) and 3 (*b*), or on a surface of the light control film itself, i.e. a single layer on which convex and concave shapes are formed as shown in 3 (*c*).

When light enters into the light control film of the present invention from the surface opposite the rough surface on which the convex and concave shapes are formed and is emitted from the rough surface, the light control film of the present invention controls direction of the light so that the amount of the light emitted at an angle to the front direction within a predetermined range is increased to enhance front luminance, and light diffusion prevents glare. Although the surface opposite the surface on which convex and concave shapes are formed is typically a smooth surface, it is not limited to a smooth surface. For example, the opposing surface may be matted or provided with a predetermined dot pattern.

Hereafter, the factors providing the profile of the convex and concave shapes for controlling direction of light as described above will be explained.

In the present invention, conditions (criteria) for obtaining optimum light emission were first investigated for a single convex portion (FIGS. 4-2) (revolution body) formed by rotating such an arbitrary curve such as shown in FIG. 4-1 on a xy-plane, serving as a base plane, around a z-axis perpendicular to the xy-plane, simulating the relationship between incident light and emergent light in a three-dimensional space while changing the convex shape, height thereof, angle of incident light and so forth. Distribution of light emerging from the convex side (emergent angle characteristics) was obtained by calculation for the case where light having the same distribution as that of light emerging from a light guide plate in an actual backlight unit enters from the bottom face opposite the side of the convex shape. The calculation was performed by assuming that the refractive index of the inside of the convex shape was 1.5, which is the refractive index of a common acrylic resin.

FIG. 5 shows a graph representing distribution of emergent lights produced by simulation performed for the convex portion having the shape shown in FIG. 4-2. In the graph, the solid line represents distribution of emergent light, and the dotted line represents distribution of incident light. In order to provide favorable front luminance and light scattering to a certain degree, it is desirable that most components of the light emerge at an angle within the range of 0 degree±30 degrees to the front direction.

Then, in order to find conditions for obtaining emergent light characteristics satisfying the above-mentioned criteria for a rough surface on which multiple convex portions are formed, change of emergent light distribution was simulated while the shape of the convex forms and height thereof were changed for a light control film having a multiple number of the convex forms.

The results of the simulation of the relationship between the average of absolute values of slope of the profile curve ($\theta_{ave}$) and energy of the emergent light are shown in the graph of FIG. 6. In the graph, the horizontal axis represents average of absolute values of slope of a profile curve ($\theta_{ave}$), and the vertical axis represents energy of emergent light. The points of the first group 601 indicate energy of emergent light within the range of not more than 6 degrees about the z axis (henceforth referred to as "emergent light$_6$"), those of the second group 602 indicate energy of emergent light within the range of not more than 18 degrees about the z axis (henceforth referred to as "emergent light$_{18}$"), and those of the third group 603 indicate energy of emergent light within the range of not more than 30 degrees about the z axis (henceforth referred to as "emergent light$_{30}$").

In the simulation results, there was observed a tendency of the ratio of the emergent light$_{30}$ to increase as the average of absolute values of slopes $\theta_{ave}$ became larger, but when $\theta_{ave}$ exceeded a certain level, the ratio conversely decreased. Therefore, a comprehensive index of convexo-concave profiles providing correlation with the emergent light$_{30}$ was investigated. As a result, it was found that if the skewness $P_{sk}$ defined in JIS B0601:2001 or the kurtosis $P_{ku}$ defined in JIS B0601:2001 was used for a profile curve appearing on a rough surface of a light control film, the relation with the emergent light$_{30}$ could be best defined.

FIGS. 7 and 8 show graphs representing the results of the simulation, and both represent change of the emergent light energy with change of the average of absolute values of slopes $\theta_{ave}$ plotted on the horizontal axis.

From these simulation results, it was found that the energy of emergent light having an emergent angle of 30 degrees or less tended to sharply increase when the average of absolute values of slope of the profile curve ($\theta_{ave}$) was not less than 20 degrees and not more than 70 degrees, whereas there were some cases where that portion of the emergent light$_{30}$ did not become high even if the average of absolute values of slope of the profile curve $\theta_{ave}$ was within the aforementioned range. However, it was found that if only the results obtained with an absolute value of the skewness $P_{sk}$ of the profile curve not more than 1.2 (points "•" 604 in FIG. 7) were observed, the portion of the emergent light$_{30}$ was always high. Moreover, it was found that if only the results obtained with a kurtosis ($P_{ku}$) of the profile curve not less than 1.5 and not more than 5.0 (points "•" 605 in FIG. 8) were observed, the portion of the emergent light$_{30}$ was always high.

When the average of absolute values of slopes of the profile curve ($\theta_{ave}$) is not less than 20 degrees and not more than 70 degrees, preferably not less than 20 degrees and not more than 60 degrees, more preferably not less than 20 degrees and not more than 50 degrees, if the absolute value of the skewness ($P_{sk}$) of the profile curve is not more than 1.2, preferably not more than 1.1, or the kurtosis ($P_{ku}$) of the profile curve is not less than 1.5 and not more than 5.0, preferably not less than 1.5 and not more than 4.5, a particularly superior effect can be obtained.

The results of the simulation of the relationship between the ratio ($L_r$) of the lengths of the profile curve and the energy of emergent light are shown in FIG. 9. In the graph, the horizontal axis indicates the ratio $L_r$ of the length of the profile curve to the length of a straight line defined as an intersection of the base plane and the cross section, and the vertical axis indicates energy of the emergent light. The points of the first group 901 indicate energies of emergent light within the range of not more than 6 degrees about the z axis (hereinafter "emergent light$_6$"), those of the second group 902 indicate energies of emergent light within the range of not more than 18 degrees about the z axis (hereinafter "emergent light$_{18}$"), and those of the third group 903 indicate energies of emergent light within the range of not more than 30 degrees about the z axis (hereinafter "emergent light$_{30}$").

In the simulation results, there was observed a tendency of the ratio of the emergent light$_{30}$ to increase as the ratio ($L_r$) of the lengths became larger, but when $L_r$ exceeded a certain level, the ratio conversely decreased. Therefore, a comprehensive index of convexo-concave profiles providing correlation with the emergent light$_{30}$ was investigated. As a result, it was found that if the skewness $P_{sk}$ as defined in JIS B0601: 2001, or the kurtosis, $P_{ku}$ as defined in JIS B0601:2001, was the profile curve for a rough surface of a light control film, the relation with the emergent light$_{30}$ is best defined.

FIGS. 10 and 11 show graphs representing the results of the simulation, and both represent change of the emergent light energy with change of the ratio of the lengths $L_r$ plotted on the horizontal axis.

From these simulation results, it was found that the energy of emergent light having an emergent angle of 30 degrees or less tended to sharply increase when the ratio of the lengths $L_r$ was not less than 1.1 and not more than 1.8, whereas there were some cases where the portion of the emergent light$_{30}$ did not become high even if the ratio of the lengths $L_r$ was within the aforementioned range. However, it was found that for an absolute value of the skewness ($P_{sk}$) of the profile curve not more than 1.2 (points of "•" 904 in FIG. 10), the portion of the emergent light$_{30}$ was always high. Moreover, it was found that for a kurtosis ($P_{ku}$) of the profile curve not less than 1.0 and not more than 4.5 (points of "•" 905 in FIG. 11), the portion of the emergent light$_{30}$ was always high.

When the ratio of the lengths $L_r$ is not less than 1.1 and not more than 1.8, preferably not less than 1.2 and not more than 1.7, more preferably not less than 1.3 and not more than 1.6, if the absolute value of the skewness $P_{sk}$ of the profile curve is not more than 1.2, preferably not more than 1.1, or the kurtosis ($P_{ku}$) of the profile curve is not less than 1.0 and not more than 4.5, preferably not less than 1.0 and not more than 4.0, a particularly superior effect can be obtained.

The criteria described above must be satisfied for substantially all cross-sections. The expression "substantially all cross-sections" means that it is sufficient that the foregoing criteria are satisfied for almost all of multiple observed cross-sections of a certain specific light control film, inclusive of a case where the criteria are not satisfied for one or two cross-sections. For example, for a cross-section in an end portion of the light control film, the aforementioned criteria may not be satisfied because of an insufficient number of convex and concave shapes. However, for a comparatively long profile curve, the aforementioned criteria should be satisfied.

In the aforementioned simulation for identifying the criteria which the rough surface of the present invention must satisfy, the convex shapes were assumed to be formed of a material having a refractive index of 1.5. However, materials generally used for optical films can be used for the patterned layer of the light control film of the present invention, and the refractive index thereof is not limited to 1.5. If the criterion is expressed in terms of the refractive index n, when the average of absolute values of slope of the profile curve $\theta_{ave}$ is not less than (36−10n) degrees and not more than (86−10n) degrees, and the absolute value of skewness of the profile curve is not more than (n−0.4) or the kurtosis of the profile curve is not less than 1.5 and not more than (10n−11.5), the aforementioned desired effect can be obtained. Further, when the ratio of the lengths $-(L_r$ is not less than (1.9−0.5n) and not more than 1.8, and the absolute value of skewness of the profile curve is not more than (n−0.4) or the kurtosis of the profile curve is not less than 1.0 and not more than (10n−11.5), the desired effect can also be obtained.

By designing the convexo-concave profile taking into consideration the refractive index of the material of the patterned layer as described above, the luminance in the front direction can be further improved.

By designing the rough surface so that it satisfies the aforementioned criteria, the light control film of the present invention will exhibit high front luminance, and provide a certain degree of light diffusion. The light control film of the present invention meeting the foregoing criteria is disposed, for example, directly on a light guide plate of a backlight unit of the edge light type, or via a light diffusion member on a light source of a backlight unit of the direct type, and used as a film for controlling the direction of emergent light of the backlight unit.

So long as the profile curves of the rough surface of the light control film of the present invention satisfy the aforementioned criteria, the shape and arrangement of the convex projections are not particularly limited. However, the convex projections and concave recesses are preferably randomly arranged. If a random arrangement is used, it becomes easy to satisfy the aforementioned criteria for substantially any section (substantially all sections), and generation of an interference pattern is easily prevented. Individual convex portions and concave portions may have the same shape or different shapes, and they may overlap with one another, i.e. part of all of the convex portions and concave portions may overlap with one another. The height of the convex portions and depth of the concave portions are both about 3 to 100 µm, and the density of the convex portions or the concave portions is preferably about 10 to 200,000 portions/mm². A typical rough surface of the light control film satisfying the aforementioned criteria is shown in FIG. 12.

Hereinafter, specific configurations for the light control film having the above-described rough surface will be explained.

The substrate 11 and the patterned layer 12 of the light control film 10 of the present invention, may be formed of any material generally used for optical films. Specifically, the material for the substrate 11 is not especially limited so long as it exhibits favorable light transmission, and plastic films such as films of polyethylene terephthalate, polybutylene terephthalate, polyethylene naphthalate, polycarbonate, polyethylene, polypropylene, polystyrene, triacetyl cellulose, polyacrylate, polyvinyl chloride, and so forth can be used.

The material for the patterned layer 12 is not also especially limited so long as it exhibits favorable light transmission property. Thus, polymer resins, and so forth can be used. Examples of suitable glass include oxide glass such as silicate glass, phosphate glass, and borate glass. Examples of suitable polymer resins include thermoplastic resins, thermosetting resins, and ionizing radiation curable resins such as polyester resins, acrylic resins, acrylic urethane resins, polyester acrylate resins, polyurethane acrylate resins, epoxy acrylate resins, urethane resins, epoxy resins, polycarbonate resins, cellulose resins, acetal resins, vinyl resins, polyethylene resins, polystyrene resins, polypropylene resins, polyamide resins, polyimide resins, melamine resins, phenol resins, silicone resins, and fluorocarbon resins.

Among these polymer resins, those preferred in view of workability and handling property, and those having a refractive index (JIS K7142:1996) of about 1.3 to 1.7 are especially preferably used. Even if a material having a refractive index n out of the aforementioned range is used for the patterned layer, favorable luminance can be realized so long as the aforementioned conditions (A1 OR A2) AND (B1 OR B2) are satisfied. However, by using a material having a refractive index within such a range, high luminance can be obtained. In particular, by designing the rough surface to satisfy the conditions (A1' OR A2') AND (B1 OR B2), defined depending on the refractive index of the material, front luminance can be further improved.

Although the patterned layer 12 may comprise light diffusing agents such as beads of organic materials and inorganic pigments, like conventional light diffusive sheets, such diffusing agents are not indispensable because the light control film of the present invention produces a light diffusing effect to a certain degree by the rough surface itself, even if it does not contain light diffusing agents. If light diffusing agents are not used, adjacent elements will not be damaged by the light diffusing agents, and dust will not be generated from the light diffusing agents.

The patterned layer 12, is preferably formed by 1) using an embossing roller, 2) an etching treatment, or 3) molding. However, molding is preferred because it enables production of light control films having a predetermined patterned layer with good reproducibility. Specifically, the patterned layer 12 can be obtained by preparing a mold having a profile complementary to that of the rough surface, casting a material such as a polymer resin into the mold, curing the material, and taking out the cured material from the mold. When a substrate is used, the patterned layer 12 can be obtained by casting a polymer resin or the like into the mold, superimposing a transparent substrate thereon, curing the polymer resin, and taking out the cured material together with the transparent substrate from the mold.

Although the method of forming a profile complementary to the rough surface in the mold is not particularly limited, the following method can be employed. For example, convex portions having a specific shape are formed on a plate so that the density of the portions is several thousands convex shapes/mm², using a laser microprocessing technique, and this plate is used as a male mold to prepare a female mold. The specific shape of the convex portions is such that when profile curves are measured for one whole convex portion at equal intervals of a length that correctly reflects the shape of the convex portion (1.0 μm or shorter), the average thereof satisfies the conditions (A1 or A2) and (B1 or B2). Alternatively, resin plates having a convex-concave layer are prepared by curing a resin containing particles of a predetermined particle size dispersed therein, the surfaces of the patterned layers are measured by using a surface profiler to choose a resin plate satisfying the aforementioned conditions, and a female mold is prepared by using the chosen plate as a male mold.

Although the surface of the light control film opposite the rough surface may be smooth, alternatively it may be subjected to a fine matting treatment in order to prevent generation of Newton rings when the film is brought into contact with a light guide plate or resin plate, or an antireflection treatment in order to improve light transmittance.

Moreover, in order to obtain favorable front luminance, as an optical characteristic of the light control film, the film desirably has a haze of 60% or more, preferably 70% or more. The haze referred to herein is a value for haze as defined in JIS K7136:2000, and is obtained in accordance with the equation: Haze (%)=$[(\tau_4/\tau_2)-\tau_3(\tau_2/\tau_1)]\times 100$ ($\tau_1$: flux of incident light, $\tau_2$: total light flux transmitted through a test piece, $\tau_3$: light flux diffused in a unit, $\tau_4$: light flux diffused in the unit and test piece).

Although the total thickness of the light control film is not particularly limited, it is usually about 20 to 300 μm.

The light control film of the present invention described above may be used in a backlight unit constituting a liquid crystal display, light signboard, or the like.

The backlight unit of the present invention consists of at least a light control film and a light source wherein the light control film is the aforementioned light control film. Although the arrangement of the light control film within the backlight unit is not particularly limited, the rough surface preferably serves as the light emergent surface. The backlight unit may be the edge light type or the direct type.

A backlight unit of the edge light type consists of a light guide plate, a light source directed toward at least one edge surface of the light guide plate, and a light control film disposed on the light emergent surface side of the light guide plate. The light control film is preferably used, with its rough surface serving as the light emergent surface. Further, a prism sheet is preferably used between the light guide plate and the light control film. With such a configuration, a backlight unit exhibiting a superior balance of front luminance and view angle, and without glare which is a problem peculiar to a prism sheet, can be provided.

The light guide plate has a substantially plate-like shape with at least one edge surface serving as a light receiving surface and one surface perpendicular to the side surface serving as a light emergent surface, and mainly consists of a matrix resin selected from highly transparent resins such as polymethyl methacrylate. Resin particles having a refractive index different from that of the matrix resin may be added as required. Each surface of the light guide plate need not be a uniform plane, but may have a complicated surface profile, or may be printed with a dot pattern or the like to provide diffusion.

The light source is disposed directed toward at least one edge surface of the light guide plate, and is usually a cold-cathode tube. Examples of the shape of the light source include a linear shape, L-shape, and so forth.

Besides the aforementioned light control film, light guide plate, and light source, the backlight unit of the edge light type is provided with a light reflector, a polarization film, an electromagnetic wave shield film etc., depending on its intended use.

One embodiment of the backlight unit of the edge light type according to the present invention is shown in FIG. 13. This backlight unit 140 has light sources 142 on both sides of a light guide plate 141, and a light control film 143 is placed on the light guide plate 141 to provide an outward facing rough surface. The light sources 142 are covered with rear reflectors 144 except for an area facing the light guide plate 141 so that light from the light source efficiently enters into the light guide plate 141. Moreover, a light reflector 146 within a chassis 145 is provided under the light guide plate 141. With this configuration, light emitted from the side of the light guide plate 141 opposite the emergent side is returned into the light guide plate 141 to increase the amount of light emerging from the emergent surface of the light guide plate 141.

A backlight unit of the direct type consists of a light control film, a light diffusive member and a light source disposed, in this order, on a surface of the light control film opposite the light emergent surface. The light control film preferably has the rough surface serving as the light emergent surface. Moreover, a prism sheet is preferably included between the light diffusive member and the light control film. With such a configuration, a backlight unit exhibiting superior balance of front luminance and view angle, without glare which is a problem peculiar to a prism sheet, can be provided.

The purpose of the light diffusive member is to eliminate any image of the light source. A milky resin plate, a transparent substrate on which a dot pattern is formed on a portion corresponding to the light source (lighting curtain) or a so-called light diffusing film having a convexo-concave light diffusing layer on a transparent substrate, can be used individually or in a suitable combination, as the light diffusive member.

The light source is usually a cold-cathode tube. The light source may have a linear shape or a, L-shape. In addition to the aforementioned light control film, light diffusive member, and light source, the backlight unit of the direct type may also include a light reflector, a polarization film, an electromagnetic wave shield film, etc., depending on the intended use.

One embodiment of the backlight unit of the direct type according to the present invention is shown in FIG. 14. This backlight unit 150 has plural light sources 152 provided above a light reflector 156 within a chassis 155, and a light control film 153 is placed thereon via a light diffusive member 157 as shown in the drawing.

Because the backlight unit of the present invention utilizes a light control film having a specific rough surface to control direction of light emitted from the light source or the light guide plate, front luminance is improved as compared with conventional backlights which suffer from the problems of glare and scratches.

EXAMPLES

Hereinafter, the present invention will be further explained with reference to examples.

Examples 1 to 4

Four molds (1) to (4) on which predetermined convexo-concave profiles were formed by a laser microprocessing technique were prepared, an ultraviolet curable resin having a refractive index of 1.50 was poured into the molds (1) to (3), and a silicone resin having a refractive index of 1.40 was poured into the mold (4). Subsequently, the resins poured into the molds were cured, and then removed from the molds to obtain light control films (1) to (4) having a size of 23 cm (for the dimension perpendicular to the light source)×31 cm (for the dimension parallel to the light source) (light control films of Examples 1 to 4).

Then, surface profiles of the rough surfaces (light emergent surfaces) of the light control films (1) to (4) were measured according to JIS B0601:2001 by using a surface profiler (SAS-2010 SAU-II, MEISHIN KOKI). This surface profiler had a contact finger in the shape of a cone with a spherical tip having a radius of 2 µm and a conical angle of 60 degrees. The measurement interval was 1.0 µm. The measurement was performed at 5 arbitrary positions on each light control film, in arbitrary directions, and averages of absolute values of slopes to the light entering surface ($\theta_{ave}$) of the obtained profile curves were calculated. Further, for the same profile curves, values of the skewness ($P_{sk}$), as defined in JIS B0601:2001, were obtained. The results obtained for the light control films (1) to (4) are shown in Table 1 (the unit of slope being in degrees). Further, by using a turbidimeter (NDH2000, Nippon Denshoku), hazes of the light control films (1) to (4) were measured according to JIS K7136:2000. The results of these measurements are shown in Table 1.

TABLE 1

|  | $\theta_{ave}$ (degree) | $|P_{sk}|$ | haze (%) |
|---|---|---|---|
| Example 1 | 43.6 | 0.916 | 97.3 |
|  | 44.1 | 0.937 |  |
|  | 42.4 | 0.940 |  |
|  | 44.7 | 0.958 |  |
|  | 45.4 | 0.926 |  |
| Example 2 | 38.6 | 0.595 | 75.5 |
|  | 37.5 | 0.599 |  |
|  | 37.9 | 0.596 |  |
|  | 38.5 | 0.613 |  |
|  | 40.4 | 0.609 |  |
| Example 3 | 25.5 | 0.055 | 78.9 |
|  | 25.6 | 0.057 |  |
|  | 26.4 | 0.057 |  |
|  | 24.5 | 0.057 |  |
|  | 26.6 | 0.053 |  |
| Example 4 | 38.6 | 0.645 | 74.6 |
|  | 37.7 | 0.663 |  |
|  | 39.8 | 0.655 |  |
|  | 37.0 | 0.622 |  |
|  | 36.8 | 0.630 |  |

As seen from the results shown in Table 1, the light control films of Examples 1 to 4 showed averages of absolute values of slopes not less than 20 degrees and not more than 75 degrees for all the profile curves. Further, the absolute values of skewness were not more than 1.2 for all the profile curves. Moreover, all the light control films of Examples 1 to 4 had a haze of 70% or higher, and thus satisfied the optical characteristics required for obtaining favorable front luminance.

Then, the light control films (1) to (4) were each incorporated into a 15-inch edge light type backlight unit (one cold-cathode tube was provided at each of upside and downside edges), and front luminance was measured. That is, the light control films (1) to (4) were each disposed on a light guide plate so that the rough surface served as the light emergent surface, and the luminance was measured at each emergent angle for lines in the parallel and perpendicular directions with respect to the light source (cold-cathode tubes), which lines were positioned at the center of the backlight unit (1 inch=2.54 cm). The results obtained for the light control films (1) to (4) are shown in Table 2 (units of cd/m²).

TABLE 2

|  |  | luminance (cd/m²) | | | |
|---|---|---|---|---|---|
|  |  | Example 1 | Example 2 | Example 3 | Example 4 |
| parallel direction | left 45 deg. | 1010 | 1030 | 1100 | 1050 |
|  | left 30 deg. | 2160 | 2100 | 1860 | 2020 |
|  | 0 deg. | 2460 | 2380 | 2030 | 2260 |
|  | right 30 deg. | 2120 | 2070 | 1840 | 1990 |
|  | right 45 deg. | 999 | 1020 | 1090 | 1040 |
| perpendicular direction | up 45 deg. | 713 | 772 | 1030 | 860 |
|  | up 30 deg. | 2290 | 2240 | 2010 | 2160 |
|  | 0 deg. | 2460 | 2380 | 2030 | 2260 |
|  | down 30 deg. | 2270 | 2220 | 2010 | 2150 |
|  | down 45 deg. | 703 | 762 | 1020 | 850 |

The results shown in Table 2 demonstrate that, for the light control films of Examples 1 to 4, by incorporating only one sheet of light control film into the backlight unit, the luminance for emergent angles of 30 degrees or less could be increased, and thus provide strong light emergent in the front direction.

Examples 5 to 8

Four molds (5) to (8) with predetermined convexo-concave profiles were formed by a laser microprocessing technique, an ultraviolet curable resin having a refractive index of 1.50 was poured into the molds (5) to (7), and a silicone resin having a refractive index of 1.40 was poured into the mold (8). Subsequently, the resins in the molds were cured, and then removed from the molds to obtain light control films (5) to (8) having a size of 23 cm×31 cm (light control films of Examples 5 to 8).

Then, surface profiles of the rough surfaces (light emergent surfaces) of the light control films (5) to (8) were measured according to JIS B0601:2001, in the same manner as that used in Examples 1 to 4. The measurements were performed at 5 arbitrary positions on each light control film in arbitrary directions, and averages of absolute values of slopes to the light entering surface of the obtained profile curves ($\theta_{ave}$) were calculated. Further, for the same profile curves, values of the kurtosis ($P_{ku}$) defined in JIS B0601:2001 were obtained. The results obtained for the light control films (5) to (8) are shown in Table 3 (unit of the slope is given as degrees). Further, by using a turbidimeter (NDH2000, Nippon Denshoku), hazes of the light control films (5) to (8) were measured according to JIS K7136:2000. The results of the measurements are shown in Table 3.

TABLE 3

|  | $\theta_{ave}$ (degree) | $P_{ku}$ | haze (%) |
|---|---|---|---|
| Example 5 | 42.3 | 2.590 | 82.7 |
|  | 40.8 | 2.472 |  |
|  | 40.9 | 2.515 |  |
|  | 43.8 | 2.580 |  |
|  | 41.6 | 2.618 |  |
| Example 6 | 38.0 | 2.260 | 82.1 |
|  | 36.9 | 2.268 |  |
|  | 36.8 | 2.347 |  |
|  | 38.5 | 2.320 |  |
|  | 37.1 | 2.267 |  |
| Example 7 | 24.5 | 1.925 | 77.5 |
|  | 23.9 | 1.930 |  |
|  | 24.1 | 1.971 |  |
|  | 24.7 | 1.962 |  |
|  | 24.7 | 1.837 |  |

TABLE 3-continued

|  | $\theta_{ave}$ (degree) | $P_{ku}$ | haze (%) |
|---|---|---|---|
| Example 8 | 25.3 | 3.885 | 82.0 |
|  | 25.9 | 4.058 |  |
|  | 24.6 | 3.835 |  |
|  | 25.5 | 3.697 |  |
|  | 24.6 | 3.932 |  |

As seen from the results shown in Table 3, the light control films of the examples showed averages of absolute values of slopes not less than 20 degrees and not more than 75 degrees for all the profile curves. Further, the absolute values for kurtosis were not less than 1.5 and not more than 5.0 for all the profile curves. Moreover, all the light control films of Examples 5 to 8 had a haze of 70% or higher, and thus had the optical characteristics required for obtaining favorable front luminance.

Then, the light control films (5) to (8) were each incorporated into a 15-inch edge light type backlight unit (one cold-cathode tube was provided at each of upside and downside edges), and front luminance was measured. That is, the light control films (5) to (8) were each disposed on a light guide plate so that the rough surface served as the light emergent surface, and the luminance was measured at each emergent angle for lines in the parallel and perpendicular directions with respect to the light source (cold-cathode tubes), which lines were positioned at the center of the backlight unit (1 inch=2.54 cm). The results obtained for the light control films (5) to (8) are shown in Table 4 (units of "cd/m$^2$").

TABLE 4

|  |  | luminance (cd/m$^2$) | | | |
|---|---|---|---|---|---|
|  |  | Example 5 | Example 6 | Example 7 | Example 8 |
| parallel direction | left 45 deg. | 1020 | 1050 | 1100 | 1060 |
|  | left 30 deg. | 2110 | 2010 | 1840 | 1970 |
|  | 0 deg. | 2390 | 2240 | 2000 | 2190 |
|  | right 30 deg. | 2070 | 1980 | 1820 | 1940 |
|  | right 45 deg. | 1010 | 1040 | 1090 | 1050 |
| perpendicular direction | up 45 deg. | 764 | 875 | 1050 | 911 |
|  | up 30 deg. | 2240 | 2150 | 1990 | 2120 |
|  | 0 deg. | 2390 | 2240 | 2000 | 2190 |
|  | down 30 deg. | 2230 | 2140 | 1980 | 2110 |
|  | down 45 deg. | 754 | 865 | 1040 | 901 |

The results shown in Table 4 demonstrate that, for the light control films of Examples 5 to 8, by incorporating only one sheet of light control film into the backlight unit, the luminance for emergent light at an angle of 30 degrees or less is increased, and thus strong emergent light could be obtained in the front direction.

Comparative Examples 1 to 3

Three molds (9) to (11) on which predetermined convexo-concave profiles were formed by a laser microprocessing technique were prepared, and an ultraviolet curable resin having a refractive index of 1.50 was poured into the molds. Subsequently, the poured resin was cured, and then removed from the molds to obtain light control films (9) to (11) having a size of 23 cm×31 cm (light control films of Comparative Examples 1 to 3).

Then, surface profiles of the rough surfaces (light emergent surfaces) of the light control films (9) to (11) were measured according to JIS B0601:2001, in the same manner as that used in Examples 1 to 4. For the obtained profile curves, averages of absolute values of slopes to the light entering surface ($\theta_{ave}$) were calculated. Further, for the same profile curves, values of skewness ($P_{sk}$), as defined in JIS B0601:2001, were obtained. The results obtained for the light control films (9) to (11) are shown in Table 5 (unit of slope in degrees).

TABLE 5

|  | $\theta_{ave}$ (degree) | $|P_{sk}|$ | haze (%) |
|---|---|---|---|
| Comparative Example 1 | 31.9 | 1.261 | 80.6 |
|  | 32.8 | 1.251 |  |
|  | 32.5 | 1.310 |  |
|  | 31.8 | 1.303 |  |
|  | 33.0 | 1.229 |  |
| Comparative Example 2 | 25.1 | 1.755 | 72.7 |
|  | 25.6 | 1.673 |  |
|  | 24.6 | 1.719 |  |
|  | 25.5 | 1.759 |  |
|  | 25.4 | 1.786 |  |
| Comparative Example 3 | 20.3 | 2.159 | 68.0 |
|  | 20.8 | 2.221 |  |
|  | 20.4 | 2.123 |  |
|  | 20.3 | 2.185 |  |
|  | 21.2 | 2.130 |  |

As seen from the results shown in Table 5, the light control films of Comparative Examples 1 to 3 showed averages of absolute values of slopes not less than 20 degrees and not more than 75 degrees for all the profile curves. However, the absolute values of skewness were more than 1.2 for all the profile curves.

Then, the light control films (9) to (11) were each incorporated into a 15-inch edge light type backlight unit (one cold-cathode tube was provided at each of upside and downside edges), and front luminance was measured. That is, the light control films (9) to (11) were each disposed on a light guide plate so that the rough surface of the light control film was the light emergent surface, and the luminance was measured at each emergent angle for lines in the parallel and perpendicular directions with respect to the light source (cold-cathode tubes), which lines were positioned at the center of the backlight unit (1 inch=2.54 cm). The results obtained for the light control films (9) to (11) are shown in Table 6.

TABLE 6

|  |  | luminance (cd/m$^2$) | | |
|---|---|---|---|---|
|  |  | Comparative Example 1 | Comparative Example 2 | Comparative Example 3 |
| parallel direction | left 45 deg. | 1220 | 1230 | 1240 |
|  | left 30 deg. | 1470 | 1430 | 1380 |
|  | 0 deg. | 1440 | 1390 | 1320 |
|  | right 30 deg. | 1460 | 1430 | 1380 |
|  | right 45 deg. | 1210 | 1220 | 1230 |
| perpendicular direction | up 45 deg. | 1460 | 1500 | 1550 |
|  | up 30 deg. | 1630 | 1600 | 1550 |
|  | 0 deg. | 1440 | 1390 | 1320 |
|  | down 30 deg. | 1640 | 1610 | 1570 |
|  | down 45 deg. | 1450 | 1490 | 1540 |

The results shown in Table 6 demonstrate that when the light control films of Comparative Examples 1 to 3 were incorporated into the backlight unit, front luminance was not sufficient.

Comparative Examples 4 to 6

Three molds (12) to (14) with predetermined convexo-concave profiles were formed by a laser microprocessing technique, and an ultraviolet curable resin having a refractive index of 1.50 was poured into the molds. Subsequently, the poured resin was cured, and then removed from the molds to obtain light control films (12) to (14) having a size of 23 cm×31 cm (light control films of Comparative Examples 4 to 6).

Then, surface profiles of the rough surfaces (light emergent surfaces) of the light control films (12) to (14) were measured according to JIS B0601:2001, in the same manner as that used in the examples. For the obtained profile curves, averages of absolute values of slopes to the light entering surface ($\theta_{ave}$) were calculated. Further, for the same profile curves, values for kurtosis ($P_{ku}$), as defined in JIS B0601:2001, were obtained. The results obtained for the light control films (12) to (14) are shown in Table 7 (units of slope in degrees).

TABLE 7

|  | $\theta_{ave}$ (degree) | $P_{ku}$ | haze (%) |
|---|---|---|---|
| Comparative Example 4 | 21.2 | 7.720 | 73.2 |
|  | 21.3 | 7.918 |  |
|  | 21.0 | 8.042 |  |
|  | 20.3 | 7.349 |  |
|  | 20.6 | 7.600 |  |
| Comparative Example 5 | 25.1 | 1.351 | 75.8 |
|  | 25.7 | 1.347 |  |
|  | 24.4 | 1.306 |  |
|  | 25.7 | 1.416 |  |
|  | 24.8 | 1.299 |  |
| Comparative Example 6 | 31.2 | 5.885 | 77.1 |
|  | 32.3 | 5.809 |  |
|  | 30.0 | 6.002 |  |
|  | 30.3 | 5.759 |  |
|  | 30.8 | 5.672 |  |

As seen from the results shown in Table 7, the light control films of Comparative Examples 4 to 6 showed averages of absolute values of slopes not less than 20 degrees and not more than 75 degrees for all the profile curves. However, the absolute values for kurtosis were less than 1.5 or more than 5.0 for all the profile curves.

Then, the light control films (12) to (14) were each incorporated into a 15-inch edge light type backlight unit (one cold-cathode tube was provided at each of upside and downside edges), and front luminance was measured. That is, the light control films (12) to (14) were each disposed on a light guide plate with the rough surface of the light control film as the light emergent surface, and the luminance was measured at each emergent angle for lines in the parallel and perpendicular directions with respect to the light source (cold-cathode tubes), which lines were positioned at the center of the backlight unit (1 inch=2.54 cm). The results obtained for the light control films (12) to (14) are shown in Table 8 (as units in "cd/m²").

TABLE 8

|  |  | luminance (cd/m²) | | |
|---|---|---|---|---|
|  |  | Comparative Example 4 | Comparative Example 5 | Comparative Example 6 |
| parallel direction | left 45 deg. | 1240 | 1190 | 1230 |
|  | left 30 deg. | 1390 | 1540 | 1430 |
|  | 0 deg. | 1330 | 1550 | 1390 |
|  | right 30 deg. | 1390 | 1530 | 1430 |
|  | right 45 deg. | 1230 | 1190 | 1220 |
| perpendicular direction | up 45 deg. | 1540 | 1380 | 1490 |
|  | up 30 deg. | 1560 | 1700 | 1610 |
|  | 0 deg. | 1330 | 1550 | 1390 |
|  | down 30 deg. | 1580 | 1710 | 1620 |
|  | down 45 deg. | 1530 | 1370 | 1480 |

It can be seen from the results shown in Table 8 that when the light control films of Comparative Examples 4 to 6 were incorporated into the backlight unit, front luminance was not sufficient.

Comparative Examples 7 and 8

For commercially available light diffusive sheets (Comparative Examples 7 and 8), surface profiles of rough surfaces (light emergent surfaces) were measured at 5 arbitrary positions on each sheet, in the same manner as that used in the examples, and averages of absolute values of slopes of the profile curves ($\theta_{ave}$) were obtained. Further, for the same profile curves, skewness ($P_{sk}$) and kurtosis ($P_{ku}$) were calculated. The results are shown in Table 9.

TABLE 9

|  | $\theta_{ave}$ (degree) | $|P_{sk}|$ | $P_{ku}$ |
|---|---|---|---|
| Comparative Example 7 | 17.1 | 0.131 | 3.329 |
|  | 17.2 | 0.130 | 3.277 |
|  | 16.8 | 0.133 | 3.482 |
|  | 16.9 | 0.126 | 3.261 |
|  | 17.2 | 0.135 | 3.422 |
| Comparative Example 8 | 10.9 | 0.752 | 3.673 |
|  | 10.7 | 0.750 | 3.813 |
|  | 10.5 | 0.736 | 3.618 |
|  | 10.9 | 0.747 | 3.736 |
|  | 11.1 | 0.736 | 3.691 |

As seen from the results shown in Table 9, the light diffusive sheets of Comparative Examples 7 and 8 had averages for of absolute values of slopes outside of the range of not less than 20 degrees and not more than 75 degrees at all the measurement points.

Then, the light diffusive sheets of Comparative Examples 7 and 8 were each incorporated into a 15-inch edge light type backlight unit (one cold-cathode tube was provided at each of upside and downside edges), and front luminance was measured. That is, the light diffusive sheets of Comparative Examples 7 and 8 were each disposed on a light guide plate so that the rough surface of the light diffusive sheet was the light emergent surface, and the luminance was measured at each emergent angle for lines in the parallel and perpendicular directions with respect to the light source (cold-cathode tubes), which lines were positioned at the center of the backlight unit (1 inch 2.54 cm). The results are shown in Table 10.

TABLE 10

|  |  | luminance (cd/m²) | |
| --- | --- | --- | --- |
|  |  | Comparative Example 7 | Comparative Example 8 |
| parallel direction | left 45 deg. | 1190 | 1260 |
|  | left 30 deg. | 1560 | 1330 |
|  | 0 deg. | 1580 | 1240 |
|  | right 30 deg. | 1550 | 1330 |
|  | right 45 deg. | 1180 | 1250 |
| perpendicular direction | up 45 deg. | 1360 | 1610 |
|  | up 30 deg. | 1720 | 1500 |
|  | 0 deg. | 1580 | 1240 |
|  | down 30 deg. | 1730 | 1520 |
|  | down 45 deg. | 1350 | 1600 |

As seen from the results shown in Table 10, when the conventional light diffusive sheets were incorporated into the backlight unit, favorable front luminance could not be obtained.

Examples 9 to 12

Four molds (15) to (18) having predetermined convexo-concave profiles were formed by laser microprocessing, an ultraviolet curable resin having a refractive index of 1.50 was poured into the molds (15) to (17), and a silicone resin having a refractive index of 1.40 was poured into the mold (18). Subsequently, the poured resins were cured, and then removed from the molds to obtain light control films (15) to (18) having a size of 23 cm (for the direction perpendicular to the light source)×31 cm (for the direction parallel to the light source) (light control films of Examples 9 to 12).

Then, surface profiles of the rough surfaces (light emergent surfaces) of the light control films (15) to (18) were measured according to JIS B0601:2001, using a surface profiler (SAS-2010 SAU-II, MEISHIN KOKI). This surface profiler had a contact finger in the shape of a cone with a spherical tip with a radius of 2 μm and a conical angle of 60 degrees. The measurement interval was 1.0 μm.

The measurement was performed at 5 arbitrary positions on each light control film in arbitrary directions, lengths of the obtained profile curves (L2) were measured, and ratios $L_r$=L2/L1 were calculated. Further, for the same profile curves, values for skewness $P_{sk}$, as defined in JIS B0601:2001, were obtained. The results obtained for the light control films (15) to (18) are shown in Table 11 (units of slope in degrees). Further, by using a turbidimeter (NDH2000, Nippon Denshoku), hazes of the light control films (15) to (18) were measured according to JIS K7136:2000. The measurement results are also shown in Table 11.

TABLE 11

|  | $L_r$ | $|P_{sk}|$ | haze (%) |
| --- | --- | --- | --- |
| Example 9 | 1.677 | 0.097 | 82.7 |
|  | 1.630 | 0.097 |  |
|  | 1.654 | 0.095 |  |
|  | 1.650 | 0.101 |  |
|  | 1.661 | 0.094 |  |
| Example 10 | 1.392 | 0.248 | 82.1 |
|  | 1.330 | 0.237 |  |
|  | 1.360 | 0.253 |  |
|  | 1.341 | 0.251 |  |
|  | 1.346 | 0.237 |  |
| Example 11 | 1.265 | 0.461 | 96.5 |
|  | 1.215 | 0.483 |  |
|  | 1.202 | 0.439 |  |
|  | 1.262 | 0.455 |  |
|  | 1.254 | 0.459 |  |

TABLE 11-continued

|  | $L_r$ | $|P_{sk}|$ | haze (%) |
| --- | --- | --- | --- |
| Example 12 | 1.455 | 0.120 | 82.5 |
|  | 1.489 | 0.126 |  |
|  | 1.450 | 0.117 |  |
|  | 1.513 | 0.126 |  |
|  | 1.457 | 0.121 |  |

As seen from the results shown in Table 11, the light control films of Examples 9 to 12 showed ratios $L_r$ of not less than 1.1 and not more than 1.8 for all the profile curves. Further, the absolute values of skewness were not more than 1.2 for all the profile curves. Moreover, all the light control films of Examples 9 to 12 had a haze of 70% or higher, and thus had the optical characteristics required for obtaining favorable front luminance.

Then, the light control films (15) to (18) were each incorporated into a 15-inch edge light type backlight unit (one cold-cathode tube was provided at each of upside and downside edges), and front luminance was measured. That is, the light control films (15) to (18) were each disposed on a light guide plate so that the rough surface was the light emergent surface, and the luminance was measured at each emergent angle for lines in the parallel and perpendicular directions with respect to the light source (cold-cathode tubes), which lines were positioned at the center of the backlight unit (1 inch=2.54 cm). The results obtained for the light control films (15) to (18) are shown in Table 12 (units are "cd/m²").

TABLE 12

|  |  | luminance (cd/m²) | | | |
| --- | --- | --- | --- | --- | --- |
|  |  | Example 9 | Example 10 | Example 11 | Example 12 |
| parallel direction | L 45 deg. | 1090 | 1090 | 1110 | 1110 |
|  | L 30 deg. | 1820 | 1800 | 1750 | 1770 |
|  | 0 deg. | 1920 | 1900 | 1830 | 1850 |
|  | R 30 deg. | 1800 | 1790 | 1740 | 1750 |
|  | R 45 deg. | 1100 | 1100 | 1120 | 1100 |
| perpendicular direction | U 45 deg. | 1060 | 1070 | 1130 | 1110 |
|  | U 30 deg. | 1950 | 1930 | 1880 | 1900 |
|  | 0 deg. | 1920 | 1900 | 1830 | 1850 |
|  | D 30 deg. | 1950 | 1930 | 1900 | 1900 |
|  | D 45 deg. | 1090 | 1110 | 1160 | 1140 |

The results shown in Table 12 demonstrate that, for the light control films of Examples 9 to 12, only by incorporating only one sheet of light control film into the backlight unit, the luminance for emergent angler of 30 degrees or less could be increased, and thus strong emergent light was emitted in the front direction.

Examples 13 to 16

Four molds (19) to (22) with predetermined convexo-concave profiles were formed by laser microprocessing, an ultraviolet curable resin having a refractive index of 1.50 was poured into the molds (19) to (21), and a silicone resin having a refractive index of 1.40 was poured into the mold (22). Subsequently, the poured resins were cured, and then removed from the molds to obtain light control films (19) to (22) having a size of 23 cm×31 cm (light control films of Examples 13 to 16).

Then, surface profiles of the rough surfaces (light emergent surface) of the light control films (19) to (22) were measured according to JIS B0601:2001, in the same manner as that used in Examples 1 to 4. The measurement was performed at 5 arbitrary positions on each light control film in arbitrary directions, lengths of the obtained profile curves (L2) were measured, and ratios $L_r$ thereof to the lengths of bases of the sections L1, i.e. $L_r$=L2/L1 were calculated. Further, for the same profile curves, values of kurtosis ($P_{ku}$), as defined in JIS B0601:2001 were obtained. The results obtained for the light control films (19) to (22) are shown in Table 13 (unit of slope is in "degrees"). Further, by using a turbidimeter (NDH2000, Nippon Denshoku), hazes of the light control films (19) to (22) were measured according to JIS K7136:2000. The results of these measurements are shown in Table 13.

TABLE 13

|  | $L_r$ | $P_{ku}$ | haze (%) |
|---|---|---|---|
| Example 13 | 1.685 | 1.651 | 82.3 |
|  | 1.679 | 1.651 |  |
|  | 1.761 | 1.700 |  |
|  | 1.657 | 1.624 |  |
|  | 1.682 | 1.676 |  |
| Example 14 | 1.376 | 4.023 | 76.2 |
|  | 1.326 | 4.032 |  |
|  | 1.333 | 3.848 |  |
|  | 1.316 | 4.141 |  |
|  | 1.418 | 3.942 |  |
| Example 15 | 1.288 | 2.146 | 82.6 |
|  | 1.250 | 2.206 |  |
|  | 1.261 | 2.148 |  |
|  | 1.275 | 2.248 |  |
|  | 1.276 | 2.099 |  |
| Example 16 | 1.326 | 2.260 | 94.3 |
|  | 1.391 | 2.343 |  |
|  | 1.381 | 2.197 |  |
|  | 1.365 | 2.244 |  |
|  | 1.323 | 2.372 |  |

As seen from the results shown in Table 13, the light control films of the examples showed ratios of the lengths $L_r$ not less than 1.1 and not more than 1.8 for all the profile curves. Further, the absolute values of kurtosis were not less than 1.0 and not more than 4.5 for all the profile curves. Moreover, all the light control films of Examples 13 to 16 had a haze of 70% or higher, and thus had the optical characteristics required for obtaining favorable front luminance.

Then, the light control films (19) to (22) were each incorporated into a 15-inch edge light type backlight unit (one cold-cathode tube was provided at each of upside and downside edges), and front luminance was measured. That is, the light control films (19) to (22) were each disposed on a light guide plate so that the rough surface was the light emergent surface, and the luminance was measured at each emergent angle for lines in the parallel and perpendicular directions with respect to the light source (cold-cathode tubes), which lines were positioned at the center of the backlight unit (1 inch=2.54 cm). The results obtained for the light control films (19) to (22) are shown in Table 14 (units in "cd/m²").

TABLE 14

|  |  | luminance (cd/m²) | | | |
|---|---|---|---|---|---|
|  |  | Example 13 | Example 14 | Example 15 | Example 16 |
| parallel direction | Left 45 deg. | 1140 | 1130 | 1130 | 1070 |
|  | Left 30 deg. | 1660 | 1690 | 1690 | 1880 |
|  | 0 deg. | 1700 | 1740 | 2010 | 1870 |
|  | Right 30 deg. | 1630 | 1680 | 1670 | 1860 |
|  | Right 45 deg. | 1150 | 1140 | 1140 | 1080 |
| perpendicular direction | UP 45 deg. | 1240 | 1200 | 1200 | 984 |
|  | UP 30 deg. | 1800 | 1830 | 1830 | 2010 |
|  | 0 deg. | 1700 | 1740 | 2010 | 1870 |
|  | Down 30 deg. | 1810 | 1840 | 1830 | 2000 |
|  | Down 45 deg. | 1260 | 1230 | 1220 | 1020 |

The results in Table 14 show that, for the light control films of Examples 13 to 16, by incorporating only one sheet of light control film into the backlight unit, the luminance for emergent angler of 30 degrees or less could be increased, and thus strong emergent light is emitted in the front direction.

Comparative Examples 9 to 11

Three molds (23) to (25) with predetermined convexo-concave profiles formed by laser microprocessing were prepared, and an ultraviolet curable resin having a refractive index of 1.50 was poured into the molds. Subsequently, the poured resin was cured, and then removed from the molds to obtain light control films (23) to (25) having a size of 23 cm×31 cm (light control films of Comparative Examples 9 to 11).

Then, surface profiles of the rough surfaces (light emergent surfaces) of the light control films (23) to (25) were measured according to JIS B0601:2001, in the same manner as that used in Examples 1 to 4. The lengths of the obtained profile curves L2 were measured, and ratios $L_r$ thereof to the lengths of bases of the sections L1, i.e. $L_r$=L2/L1, were calculated. Further, for the same profile curves, values for skewness ($P_{sk}$), as defined in JIS B0601:2001, were obtained. The results obtained for the light control films (23) to (25) are shown in Table 15 (slope units in "degrees").

TABLE 15

|  | $L_r$ | $|P_{sk}|$ | haze (%) |
|---|---|---|---|
| Comparative Example 9 | 1.202 | 1.261 | 81.5 |
|  | 1.143 | 1.236 |  |
|  | 1.161 | 1.302 |  |
|  | 1.162 | 1.261 |  |
|  | 1.234 | 1.304 |  |
| Comparative Example 10 | 1.141 | 1.755 | 60.8 |
|  | 1.186 | 1.741 |  |
|  | 1.113 | 1.785 |  |
|  | 1.166 | 1.708 |  |
|  | 1.130 | 1.719 |  |
| Comparative Example 11 | 1.121 | 2.159 | 64.4 |
|  | 1.153 | 2.246 |  |
|  | 1.168 | 2.655 |  |
|  | 1.143 | 2.243 |  |
|  | 1.170 | 2.225 |  |

As seen from Table 15, the light control films of Comparative Examples 9 to 11 had ratios $L_r$ not less than and not more than 1.8 for all the profile curves. However, the absolute values of skewness were more than 1.2 for all the profile curves.

Then, the light control films (23) to (25) were each incorporated into a 15-inch edge light type backlight unit (one cold-cathode tube was provided at each of upside and downside edges), and front luminance was measured. That is, the light control films (23) to (25) were each disposed on a light guide plate so that the rough surface of the light control film was the light emergent surface, and the luminance was measured at each emergent angle for lines in the parallel and perpendicular directions with respect to the light source (cold-cathode tubes), which lines were positioned at the center of the backlight unit (1 inch=2.54 cm). The results obtained for the light control films (23) to (25) are shown in Table 16.

TABLE 16

|  |  | luminance (cd/m$^2$) | | |
| --- | --- | --- | --- | --- |
|  |  | Comparative Example 9 | Comparative Example 10 | Comparative Example 11 |
| parallel direction | left 45 deg. | 1210 | 1250 | 1260 |
|  | left 30 deg. | 1480 | 1380 | 1340 |
|  | 0 deg. | 1450 | 1300 | 1240 |
|  | right 30 deg. | 1470 | 1370 | 1330 |
|  | right 45 deg. | 1200 | 1240 | 1210 |
| perpendicular direction | up 45 deg. | 1440 | 1560 | 1600 |
|  | up 30 deg. | 1640 | 1530 | 1510 |
|  | 0 deg. | 1450 | 1300 | 1240 |
|  | down 30 deg. | 1650 | 1560 | 1500 |
|  | down 45 deg. | 1440 | 1550 | 1590 |

The results in Table 16 show that when the light control films of Comparative Examples 9 to 11 were incorporated into the backlight unit, front luminance was not sufficient.

Comparative Examples 12 to 14

Three molds (26) to (28) with predetermined convexo-concave profiles were formed by laser microprocessing, and an ultraviolet curable resin having a refractive index of 1.50 was poured into the molds. Subsequently, the poured resin was cured, and then removed from the molds to obtain light control films (26) to (28) having a size of 23 cm×31 cm (light control films of Comparative Examples 12 to 14).

Then, surface profiles of the rough surfaces (light emergent surfaces) of the light control films (26) to (28) were measured according to JIS B0601:2001, in the same manner as that used in the examples. The lengths of the obtained profile curves L2 were measured, and ratios $L_r$ thereof to the lengths of bases of the sections L1 ($L_r$=L2/L1) were calculated. Further, for the same profile curves, values of the kurtosis ($P_{ku}$), as defined in JIS B0601:2001, were obtained. The results obtained for the light control films (26) to (28) are shown in Table 17 (units of slope in degrees).

TABLE 17

|  | $L_r$ | $P_{ku}$ | haze (%) |
| --- | --- | --- | --- |
| Comparative Example 12 | 1.162 | 4.573 | 74.4 |
|  | 1.171 | 4.772 |  |
|  | 1.133 | 4.654 |  |
|  | 1.214 | 4.666 |  |
|  | 1.106 | 4.721 |  |

TABLE 17-continued

|  | $L_r$ | $P_{ku}$ | haze (%) |
| --- | --- | --- | --- |
| Comparative Example 13 | 1.424 | 4.885 | 65.6 |
|  | 1.407 | 4.925 |  |
|  | 1.389 | 4.782 |  |
|  | 1.376 | 4.807 |  |
|  | 1.394 | 5.059 |  |
| Comparative Example 14 | 1.221 | 7.720 | 64.3 |
|  | 1.163 | 7.856 |  |
|  | 1.201 | 8.028 |  |
|  | 1.238 | 8.596 |  |
|  | 1.267 | 8.973 |  |

The results in Table 17 show that the light control films of Comparative Examples 12 to 14 had ratios $L_r$ not less than 1.1 and not more than 1.8 for all the profile curves. However, the absolute values of kurtosis were less than 1.0 or more than 4.5 for all the profile curves.

Then, the light control films (26) to (28) were each incorporated into a 15-inch edge light type backlight unit (one cold-cathode tube was provided at each of upside and downside edges), and front luminance was measured. That is, the light control films (26) to (28) were each disposed on a light guide plate so that the rough surface of the light control film was the light emergent surface, and the luminance was measured at each emergent angle for lines in the parallel and perpendicular directions with respect to the light source (cold-cathode tubes), which lines were positioned at the center of the backlight unit (1 inch=cm). The results obtained for the light control films (26) to (28) are shown in Table 18 (units in "cd/m$^2$").

TABLE 18

|  |  | luminance (cd/m$^2$) | | |
| --- | --- | --- | --- | --- |
|  |  | Comparative Example 12 | Comparative Example 13 | Comparative Example 14 |
| parallel direction | left 45 deg. | 1210 | 1220 | 1240 |
|  | left 30 deg. | 1470 | 1440 | 1380 |
|  | 0 deg. | 1440 | 1390 | 1320 |
|  | right 30 deg. | 1470 | 1430 | 1390 |
|  | right 45 deg. | 1210 | 1220 | 1230 |
| perpendicular direction | up 45 deg. | 1450 | 1450 | 1550 |
|  | up 30 deg. | 1630 | 1600 | 1550 |
|  | 0 deg. | 1440 | 1390 | 1320 |
|  | down 30 deg. | 1640 | 1610 | 1570 |
|  | down 45 deg. | 1450 | 1490 | 1540 |

The results in Table 18 show that when the light control films of Comparative Examples 12 to 14 were incorporated into the backlight unit, front luminance was not sufficient.

Comparative Examples 15 and 16

Surface profiles of rough surfaces (light emergent surfaces) of commercially available light diffusive sheets (Comparative Examples 15 and 16), were measured at 5 arbitrary positions on each sheet in the same manner as that used in the examples, lengths of the measured profile curves L2 were measured, and ratios $L_r$ thereof to the lengths of bases of the sections L1, i.e. $L_r=L2/L1$, were calculated. Further, for the same profile curves, the skewness ($P_{sk}$) and the kurtosis ($P_{ku}$) were calculated. The results obtained for the light diffusive sheets of Comparative Examples 15 and 16 are shown in Table 19.

TABLE 19

|  | $L_r$ | $\|P_{sk}\|$ | $P_{ku}$ |
|---|---|---|---|
| Comparative Example 15 | 1.078 | 0.177 | 3.436 |
|  | 1.071 | 0.169 | 3.303 |
|  | 1.069 | 0.176 | 3.389 |
|  | 1.064 | 0.168 | 3.274 |
|  | 1.066 | 0.174 | 3.498 |
| Comparative Example 16 | 1.035 | 0.725 | 3.673 |
|  | 1.064 | 0.722 | 3.702 |
|  | 1.065 | 0.747 | 3.557 |
|  | 1.029 | 0.701 | 3.622 |
|  | 1.028 | 0.689 | 3.574 |

As seen in Table 19, the light diffusive sheets of Comparative Examples 15 and 16 did not have a ratio $L_r$ not less than 1.1 and not more than 1.8 at all the measurement points.

Next, the light diffusive sheets of Comparative Examples 15 and 16 were each incorporated into a 15-inch edge light type backlight unit (one cold-cathode tube was provided at each of upside and downside edges), and front luminance was measured. That is, the light diffusive sheets of Comparative Examples 15 and 16 were each disposed on a light guide plate so that the rough surface of the light diffusive sheet was the light emergent surface, and the luminance was measured at each emergent angle for lines in the parallel and perpendicular directions with respect to the light source (cold-cathode tubes), which lines were positioned at the center of the backlight unit (1 inch=cm). The results are shown in Table 20.

TABLE 20

|  |  | luminance (cd/m²) | |
|---|---|---|---|
|  |  | Comparative Example 15 | Comparative Example 16 |
| parallel direction | left 45 deg. | 1180 | 1260 |
|  | left 30 deg. | 1560 | 1330 |
|  | 0 deg. | 1560 | 1240 |
|  | right 30 deg. | 1550 | 1330 |
|  | right 45 deg. | 1180 | 1250 |
| perpendicular direction | up 45 deg. | 1350 | 1610 |
|  | up 30 deg. | 1710 | 1500 |
|  | 0 deg. | 1560 | 1240 |
|  | down 30 deg. | 1720 | 1520 |
|  | down 45 deg. | 1360 | 1600 |

As seen from the results shown in Table 20, when the conventional light diffusive sheets were incorporated into a backlight unit, favorable front luminance could not be obtained.

As clearly seen from the results of the foregoing examples, the light control films of the present invention exhibited superior front luminance and appropriate light diffusion, because the rough surfaces thereof have a specific configuration. Further, by incorporating such light control films into a backlight unit, backlight units exhibiting high front luminance without glare or generation of an interference pattern were obtained.

The invention claimed is:

1. A light control film having a rough surface,
   wherein the rough surface has, for an arbitrary cross section perpendicular to a base plane of the film, an average $\theta_{ave}$ of absolute values of slope, with respect to the base plane of a profile curve along the edge of the cross section contoured by the rough surface, not less than 20 degrees and not more than 75 degrees, and
   wherein substantially all profile curves have an absolute value of skewness, according to JIS B0601:2001, of not more than 1.2.

2. A light control film having a rough surface formed by a patterned layer comprising a material having a refractive index n,
   wherein the rough surface has, for an arbitrary cross section perpendicular to a base plane of the film, an average $\theta_{ave}$ of absolute values of slope, with respect to the base plane of a profile curve along the edge of the cross section contoured by the rough surface, not less than 36–10n degrees and not more than 86–10n degrees, and
   wherein substantially all profile curves have an absolute value of skewness, according to JIS B0601:2001, of not more than n–0.4.

3. A light control film having a rough surface,
   wherein the rough surface has, for an arbitrary cross section perpendicular to a base plane of the film, an average $\theta_{ave}$ of absolute values of slope, with respect to the base plane of a profile curve along the edge of the cross section contoured by the rough surface, not less than 20 degrees and not more than 75 degrees, and
   wherein substantially all profile curves have a kurtosis, according to JIS B0601:2001, of not less than 1.5 and not more than 5.0.

4. A light control film having a rough surface formed by a patterned layer comprising a material having a predetermined refractive index of n,
   wherein the rough surface has, for an arbitrary cross section perpendicular to a base plane of the film, an average $\theta_{ave}$ of absolute values of slope, with respect to the base plane of a profile curve along the edge of the cross section contoured by the rough surfaces, not less than 36–10n degrees and not more than 86–10n degrees, and
   wherein substantially all profile curves have a kurtosis, according to JIS B0601:2001, of not less than 1.5 and not more than 10n–11.

5. A light control film having a rough surface,
   wherein the rough surface has, for an arbitrary cross section perpendicular to a base plane of the film, a ratio ($L_r=L2/L1$, wherein L2 is length of a profile curve along the edge of the cross section contoured by the rough surface and L1 is length of a straight line defined as an intersection of the base plane and the cross section, and wherein the ratio is $1.1 \leq L_r \leq 1.8$, and
   wherein substantially all profile curves have an absolute value of skewness, according to JIS B0601:2001, of not more than 1.2.

6. A light control film having a rough surface formed by a patterned layer comprising a material having a refractive index n,
   wherein the rough surface has, for an arbitrary cross section perpendicular to a base plane of the film, a ratio L2/L1, wherein L2 is length of a profile curve along the edge of the cross section contoured by the rough surface and L1 is length of a straight line defined as an intersection of the base plane and the cross section, and wherein the ratio is $1.9-0.5n \leq L_r \leq 1.8$, and wherein substantially all profile curves have an absolute value of skewness, according to JIS B0601:2001, not more than n−0.4.

7. A light control film having a rough surface, wherein the rough surface has, for an arbitrary cross section perpendicular to a base plane of the film, a ratio ($L_r=L2/L1$, wherein L2 is length of a profile curve along the edge of the cross section contoured by the rough surface and L1 is length of a straight line defined as an intersection of the base plane and the cross section, and wherein the ratio is $1.1 \leq L_r \leq 1.8$, and wherein substantially all profile curves have a kurtosis, according to JIS B0601:2001 of not less than 1.0 and not more than 4.5.

8. A light control film having a rough surface formed by a patterned layer comprising a material having a refractive index n, wherein the rough surface has, for an arbitrary cross section perpendicular to a base plane of the film, a ratio $L_r=L2/L1$, wherein L2 is length of a profile curve along the edge of the cross section contoured by the rough surface and L1 is length of a straight line defined as an intersection of the base plane and the cross section, and wherein the ratio is $1.9-0.5n \leq L_r \leq 1.8$, and wherein substantially all profile curves have a kurtosis, according to JIS B0601:2001, of less than 1.0 and not more than 10n−11.5.

9. A backlight unit comprising a light guide plate and a light source directed toward at least one edge of the light guide plate, the light guide plate having a light emergent surface approximately perpendicular to the direction of the light source toward the at least one edge, and a light control film according to claim 1 provided on the light emergent surface of the light guide plate.

10. The backlight unit according to claim 9, further comprising a prism sheet between the light control film and the light guide plate.

11. A backlight unit comprising a light source, a light diffusive plate provided on one side of the light source and a light control film according to claim 1 provided on the side of the light diffusive plate opposite to the light source side.

12. A backlight unit comprising a light guide plate and a light source directed toward at least one edge of the light guide plate, the light guide plate having a light emergent surface approximately perpendicular to the direction of the light source toward the at least one edge, and a light control film according to claim 2 provided on the light emergent surface of the light guide plate.

13. A backlight unit comprising a light guide plate and a light source directed toward at least one edge of the light guide plate, the light guide plate having a light emergent surface approximately perpendicular to the direction of the light source toward the at least one edge, and a light control film according to claim 3 provided on the light emergent surface of the light guide plate.

14. A backlight unit comprising a light guide plate and a light source directed toward at least one edge of the light guide plate, the light guide plate having a light emergent surface approximately perpendicular to the direction of the light source toward the at least one edge, and a light control film according to claim 4 provided on the light emergent surface of the light guide plate.

15. A backlight unit comprising a light guide plate and a light source directed toward at least one edge of the light guide plate, the light guide plate having a light emergent surface approximately perpendicular to the direction of the light source toward the at least one edge, and a light control film according to claim 5 provided on the light emergent surface of the light guide plate.

16. A backlight unit comprising a light guide plate equipped with a light source directed toward at least one edge of the light guide plate, the light guide plate having a light emergent surface approximately perpendicular to the direction of the light source toward the at least one edge, and a light control film according to claim 6 provided on the light emergent surface of the light guide plate.

17. A backlight unit comprising a light guide plate equipped with a light source directed toward at least one edge of the light guide plate, the light guide plate and having a light emergent surface approximately perpendicular to the direction of the light source toward the at least one edge, and a light control film according to claim 7 provided on the light emergent surface of the light guide plate.

18. A backlight unit comprising a light guide plate equipped with a light source directed toward at least one edge of the light guide plate, the light guide plate having a light emergent surface approximately perpendicular to the direction of the light source toward the at least one edge, and a light control film according to claim 8 provided on the light emergent surface of the light guide plate.

* * * * *